(12) United States Patent
Yoshioka et al.

(10) Patent No.: US 10,337,622 B2
(45) Date of Patent: Jul. 2, 2019

(54) ECCENTRIC VALVE

(71) Applicant: AISAN KOGYO KABUSHIKI KAISHA, Obu-shi, Aichi-ken (JP)

(72) Inventors: Mamoru Yoshioka, Nagoya (JP); Kasumi Mishima, Toyoake (JP); Naruto Ito, Nissin (JP); Makoto Fukui, Nagoya (JP); Takashige Inagaki, Obu (JP); Sunao Kitamura, Nagoya (JP); Hiroshi Misumi, Nagoya (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 0 days.

(21) Appl. No.: 15/768,861

(22) PCT Filed: Sep. 15, 2016

(86) PCT No.: PCT/JP2016/077294
§ 371 (c)(1),
(2) Date: Apr. 17, 2018

(87) PCT Pub. No.: WO2017/110169
PCT Pub. Date: Jun. 29, 2017

(65) Prior Publication Data
US 2019/0056032 A1 Feb. 21, 2019

(30) Foreign Application Priority Data
Dec. 25, 2015 (JP) ................................. 2015-253259

(51) Int. Cl.
*F16K 1/22* (2006.01)
*F16K 31/53* (2006.01)
(Continued)

(52) U.S. Cl.
CPC ................ *F16K 1/221* (2013.01); *F16K 1/22* (2013.01); *F16K 1/224* (2013.01); *F16K 1/226* (2013.01);
(Continued)

(58) Field of Classification Search
CPC ...... F16K 1/221; F16K 1/2261; F16K 31/041; F16K 1/224; F16K 31/04; F16K 1/24;
(Continued)

(56) References Cited

U.S. PATENT DOCUMENTS 1,504,288 A * 8/1924 Vencl .......................... F16K 1/24
251/158
2,859,772 A * 11/1958 Weiss ...................... F16K 1/221
123/543

(Continued)

FOREIGN PATENT DOCUMENTS

JP     S56-138267 U    10/1981
JP     H05-240358 A     9/1993
(Continued)

OTHER PUBLICATIONS

Dec. 20, 2016 International Search Report issued in International Patent Application No. PCT/JP2016/077294.

*Primary Examiner* — John Bastianelli
(74) *Attorney, Agent, or Firm* — Oliff PLC

(57) ABSTRACT

An eccentric valve has a drive mechanism, a drive force receiving part, a bearing for supporting a rotary shaft, and a return spring for generating a return spring force. During non-operation of the drive mechanism, the eccentric valve generates a separating-direction urging force to cause the rotary shaft to incline about the bearing serving as a fulcrum and urge the valve element in a direction away from the valve seat, the separating-direction urging force being a force caused by the return spring force. Either the valve
(Continued)

element or the valve seat is provided with a sealing member to seal between the valve element and the valve seat during non-operation of the drive mechanism.

6 Claims, 25 Drawing Sheets

(51) Int. Cl.
    *F16K 1/226*      (2006.01)
    *F16K 1/24*      (2006.01)
    *F16K 31/04*      (2006.01)
    *H01M 8/04089*      (2016.01)
    *H01M 8/04228*      (2016.01)
    *H01M 8/04303*      (2016.01)

(52) U.S. Cl.
    CPC ............. *F16K 1/2261* (2013.01); *F16K 1/24* (2013.01); *F16K 31/04* (2013.01); *F16K 31/041* (2013.01); *F16K 31/53* (2013.01); *H01M 8/04089* (2013.01); *H01M 8/04228* (2016.02); *H01M 8/04303* (2016.02); *H01M 2250/20* (2013.01)

(58) Field of Classification Search
    CPC ............ F16K 1/226; F16K 31/53; F16K 1/22; H01M 8/04089; H01M 8/04228; H01M 8/04303; H01M 2250/20
    USPC ........................................................ 251/304
    See application file for complete search history.

(56) References Cited

U.S. PATENT DOCUMENTS

| | | | | |
|---|---|---|---|---|
| 3,623,696 | A | * | 11/1971 | Baumann ................... F16K 1/24 251/298 |
| 3,857,545 | A | * | 12/1974 | Santi .......................... F16K 1/24 251/229 |
| 4,073,473 | A | * | 2/1978 | Rihm ..................... F16K 1/2028 251/172 |
| 6,494,434 | B1 | * | 12/2002 | Geiser ....................... F16K 1/24 251/229 |
| 9,995,398 | B2 | * | 6/2018 | Misumi ................. F16K 1/2007 |
| 2012/0074344 | A1 | | 3/2012 | Sumiya et al. |

FOREIGN PATENT DOCUMENTS

| | | |
|---|---|---|
| JP | 2001-214816 A | 8/2001 |
| JP | 2005-140034 A | 6/2005 |
| JP | 2010-038308 A | 2/2010 |
| JP | 2012-072793 A | 4/2012 |
| JP | 2015-218833 A | 12/2015 |
| JP | 2016-002599 A | 1/2016 |

* cited by examiner

US 10,337,622 B2

ECCENTRIC VALVE

CROSS-REFERENCE TO RELATED APPLICATIONS

This is a U.S. national phase application based on the PCT International Patent Application No. PCT/JP2016/077294 filed on Sep. 15, 2016, and claiming the priority of Japanese Patent Application No. 2015-253259 filed on Dec. 25, 2015, the entire contents of which are herewith incorporated by reference.

TECHNICAL FIELD

The present invention relates to an eccentric valve (a double eccentric valve), which is a valve to be used as a flow control valve, in which a valve element is placed with its rotation center (a rotary shaft) positioned eccentrically from a center of a valve hole of a valve seat, and a seal surface of the valve element is positioned eccentrically from the rotary shaft.

BACKGROUND ART

For a flow control valve, Patent Document 1 discloses a flow open/close valve configured to come into a valve-closed state by rotating a valve element into contact with a movable seat or come into a valve-open state by rotating the valve element away from the movable seat.

RELATED ART DOCUMENTS

Patent Documents

Patent Document 1: Japanese Unexamined Patent Application Publication No. 2012-72793

SUMMARY OF INVENTION

Problems to be Solved by the Invention

However, in the flow open/close valve in Patent Document 1, the valve element is merely in contact with the movable seat in the valve-closed state where a drive source is not operated. Thus, in the valve-closed state, sealing property between the valve element and the movable seat could not be enhanced (a sealing function could not be fulfilled).

The present invention has been made to solve the above problems and has a purpose to provide an eccentric valve capable of enhancing a sealing property in a valve-closed state.

Means of Solving the Problems

To achieve the above purpose, one aspect of the invention provides an eccentric valve comprising: a valve seat including a valve hole and a seat surface formed at an edge of the valve hole; a valve element formed with a seal surface on an outer periphery corresponding to the seat surface; a rotary shaft integrally provided with the valve element to rotate the valve element, and the rotary shaft having a central axis extending in parallel to a radial direction of the valve element, the central axis of the rotary shaft being positioned eccentrically from a center of the valve hole in another radial direction of the valve hole, and the seal surface being positioned eccentrically from the central axis of the rotary shaft toward an extending direction of a central axis of the valve element, wherein the eccentric valve further comprises: a drive mechanism configured to generate a drive force to rotate the rotary shaft in a valve opening direction; a drive force receiving part integrally provided with the rotary shaft and configured to receive the drive force; a bearing placed in a position between the valve element and the drive force receiving part in a direction of the central axis of the rotary shaft to support the rotary shaft; and a return spring configured to generate a return spring force to rotate the rotary shaft in a valve closing direction, wherein, during non-operation of the drive mechanism, the eccentric valve generates a separating-direction urging force to cause the rotary shaft to incline about the bearing serving as a fulcrum and urge the valve element in a direction away from the valve seat, the separating-direction urging force being a force caused by the return spring force and acting in a direction perpendicular to a central axis of the bearing, and either the valve element or the valve seat is provided with a sealing member to seal between the valve element and the valve seat during non-operation of the drive mechanism.

According to the above configuration, during non-operation of the drive mechanism, the sealing member seals between the valve seat and the valve element. Thus, a sealing property in the valve-closed state can be enhanced.

In the foregoing configuration, preferably, the sealing member includes a deformable portion having a leading end that comes into contact with the valve element or the valve seat during non-operation of the drive mechanism and that is deformed when pressed by the valve element or a valve seat during operation of the drive mechanism, and a deformation amount of the deformable portion during operation of the drive mechanism is smaller than a deformation amount of the deformable portion when plastically deformed.

According to the above configuration, the deformable portion of the sealing member is not excessively pressed by the valve element. Thus, abrasion or wear of the sealing member can be reduced.

In the foregoing configuration, preferably, when the drive mechanism is to be switched from an operation state to a non-operation state, the drive mechanism is switched to the non-operation state after a pressure on the valve element on a side facing the valve seat, reaches a predetermined negative pressure.

According to the above configuration, the drive mechanism is operated until the pressure exerted on the valve element on the side facing to the valve seat (a valve-seat side) reaches the predetermined negative pressure. After the pressure exerted on the valve element on the valve-seat side has reached the predetermined negative pressure, the drive mechanism is not operated and the valve element is caused to move toward the valve seat by utilization of the negative pressure generated on the valve-seat side with respect to the valve element. Thus, a high sealing property can be achieved between the valve seat and the valve element.

In the foregoing configuration, preferably, the eccentric valve is configured to perform a control mode during operation of the drive mechanism, the control mode including a pressure-regulating mode for controlling an open area of the valve hole and a sealing control mode for controlling rotation of the valve element near a fully-closed position of the valve element.

According to the above configuration, the rotation of the valve element near a fully-closed position of the valve element is performed only in the sealing control mode. Thus, the number of times the valve element and the sealing member slide on each other can be reduced. Thus, abrasion or wear of the sealing member can be reduced.

In the foregoing configuration, preferably, a rotation speed of the valve element in the sealing control mode is slower than a rotation speed of the valve element in the pressure-regulating mode.

According to the above configuration, the strength of sliding of the valve element with respect to the sealing member in the sealing control mode can be reduced. Thus, abrasion or wear of the sealing member can be reduced.

In the foregoing configuration, preferably, the valve element and the sealing member in the pressure-regulating mode are in a non-contact state with each other.

According to the above configuration, in which the valve element and the sealing member are not in contact with each other in the pressure-regulating mode which is frequently performed, the number of times the valve element and the sealing member slide against each other can be minimized. Thus, abrasion or wear of the sealing member can be reduced.

In the foregoing configuration, preferably, the eccentric valve is provided with a passage through which air in a fuel cell system flows, and when the fuel cell system drives an air pump to control a flow rate of the air in response to a regenerative brake request, an opening degree of the valve element is maintained at an opening degree within an opening degree range determined in the sealing control mode.

According to the above configuration, the frequency of sliding of the valve element and the sealing member can be reduced. Therefore, while abrasion of the sealing member is suppressed, surplus electric power generated at the time of a regenerative brake request can be consumed for operating an air pump.

Effects of the Invention

According to an eccentric valve of the present invention, a sealing property in a valve-closed state can be enhanced.

MODE FOR CARRYING OUT THE INVENTION

First Embodiment

The present invention is applied for example to an integrated valve of an air system in a fuel cell system. Thus, the fuel cell system will be described first and then the integrated valve to which an eccentric valve of the invention is applied will be described later.

<Description of Fuel Cell System>

Figure 1:
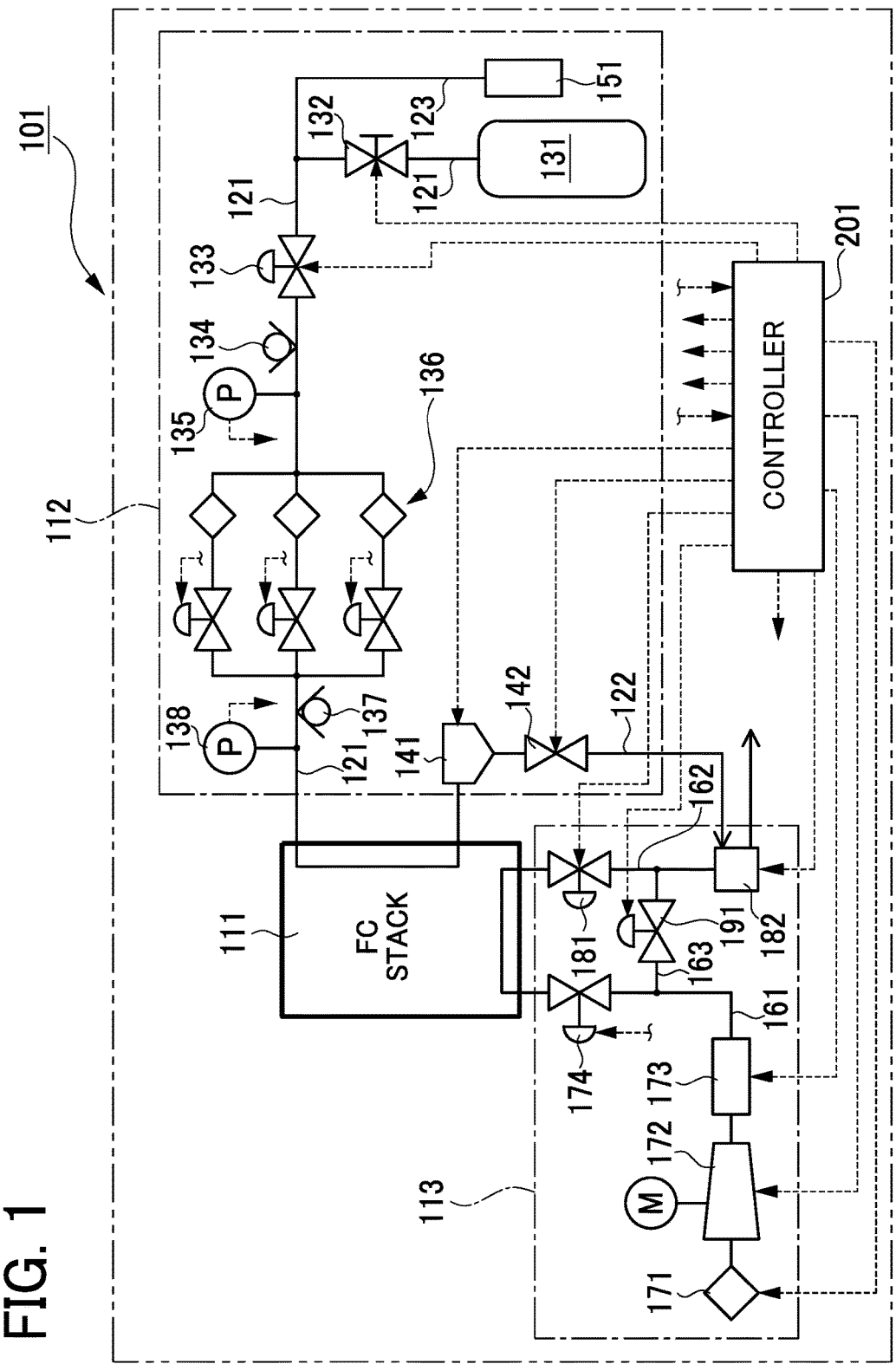
FIG. 1 is a schematic configuration view of a fuel cell system.

A fuel cell system 101 is mounted in an electric vehicle and used to supply electric power to a drive motor (not illustrated) of the vehicle. As shown in FIG. 1, the fuel cell system 101 includes a fuel cell (FC stack) 111, a hydrogen system 112, and an air system 113.

The fuel cell 111 generates power upon receiving supply of fuel gas and supply of oxidant gas. In the present embodiment, the fuel gas is hydrogen gas and the oxidant gas is air. Specifically, the fuel cell 111 generates power when receives hydrogen gas supplied from the hydrogen system 112 and air supplied from the air system 113. The electric power generated in the fuel cell 111 is supplied to a drive motor (not illustrated) through an inverter (not illustrated).

The hydrogen system 112 is provided on an anode side of the fuel cell 111. This hydrogen system 112 is provided with a hydrogen supply passage 121, a hydrogen exhaust passage 122, and a filling passage 123. The hydrogen supply passage 121 is a flow passage for supplying hydrogen gas from a hydrogen tank 131 to the fuel cell 111. The hydrogen exhaust passage 122 is a flow passage for discharging hydrogen gas exhausted from the fuel cell 111 (hereinafter, appropriately referred to as "hydrogen offgas"). The filling passage 123 for filling hydrogen gas into the hydrogen tank 131 through a fill port 151.

The hydrogen system 112 includes, on the hydrogen supply passage 121, a main stop valve 132, a high-pressure regulator 133, a medium-pressure relief valve 134, a pressure sensor 135, an injector part 136, a low-pressure relief valve 137, and a pressure sensor 138, which are arranged in this order from the hydrogen tank 131 side. The main stop valve 132 is a valve for switching between supply and shutoff of hydrogen gas from the hydrogen tank 131 to the hydrogen supply passage 121. The high-pressure regulator 133 is a pressure-regulating valve to reduce the pressure of hydrogen gas. The medium-pressure relief valve 134 is a valve configured to open when the pressure in the hydrogen supply passage 121 between the high-pressure regulator 133 and the injector part 136 becomes a predetermined pressure or higher in order to regulate the pressure to below the predetermined pressure. The pressure sensor 135 is a sensor to detect the pressure in the hydrogen supply passage 121 between the high-pressure regulator 133 and the injector part 136. The injector part 136 is a mechanism for regulating a flow rate of hydrogen gas. The low-pressure relief valve 137 is a valve configured to open when the pressure in the hydrogen supply passage 121 between the injector part 136 and the fuel cell stack 111 becomes a predetermined pressure or higher in order to regulate the pressure to below the predetermined pressure. The pressure sensor 138 is a sensor to detect the pressure in the hydrogen supply passage 121 between the injector part 136 and the fuel cell stack 111.

The hydrogen system 112 further includes, on the hydrogen exhaust passage 122, a gas-liquid separator 141 and an exhaust-drain valve 142 arranged in this order from the fuel cell stack 111 side. The gas-liquid separator 141 is a device to separate moisture from the hydrogen offgas. The exhaust-drain valve 142 is a valve to switch between exhaust and shutoff of hydrogen offgas and moisture from the gas-liquid separator 141 to a diluter 182 of the air system 113.

The air system 113 is provided on a cathode side of the fuel cell stack 111. This air system 113 is provided with an air supply passage 161, an air exhaust passage 162, and a bypass passage 163. The air supply passage 161 is a flow passage to supply air from the outside of the fuel cell system 101 into the fuel cell stack 111. The air exhaust passage 162 is a flow passage to exhaust air discharged out of the fuel cell 111 (hereinafter, appropriately referred to as "air offgas"). The bypass passage 163 is a flow passage to allow air to flow from the air supply passage 161 to the air exhaust passage 162 without passing through the fuel cell 111.

The air system 113 further includes, on the air supply passage 161, an air cleaner 171, an air pump 172, an intercooler 173, and a sealing valve 174, which are arranged in this order. The air cleaner 171 is a device to clean up the air taken from outside into the fuel cell system 101. The air pump 172 is a device to regulate a flow rate of air. The intercooler 173 is a device to cool air. The sealing valve 174 is a valve to switch between supply and shutoff of air to the fuel cell 111.

The air system 113 further includes, on the air exhaust passage 162, an outlet integrated valve 181 and the diluter 182 arranged in this order from the fuel cell 111 side.

The outlet integrated valve 181 is a valve (a valve having a function that seals air) to switch between exhaust and shutoff of the air offgas from the fuel cell 111 and also a valve (a valve having a function that controls a flow rate) to control an exhaust amount of air offgas from the fuel cell 111. In the present embodiment, the eccentric valve of the present invention is applied to the integrated valve 181.

The diluter 182 is a device to dilute hydrogen offgas exhausted from the hydrogen exhaust passage 122 by the air offgas and the air flowing through the bypass passage 163.

The air system 113 further includes a bypass valve 191 on the bypass passage 163. The bypass valve 191 is a valve to control a flow rate of air in the bypass passage 163.

The fuel cell system 101 is further provided with a controller 201 to control the system. Specifically, the controller 201 is configured to control each part or device of the fuel cell system 101. In addition, the fuel cell system 101 also includes a cooling system (not shown) to cool the fuel cell 111. In the present embodiment, the controller 201 is for example an ECU.

In the fuel cell system 101 configured as above, the hydrogen gas supplied from the hydrogen supply passage 121 to the fuel cell 111 is consumed in the fuel cell 111 to generate electric power and thereafter is exhausted as hydrogen offgas from the fuel cell 111 to the outside of the fuel cell system 101 through the hydrogen exhaust passage 122 and the diluter 182. The air supplied from the air supply passage 161 to the fuel cell 111 is consumed in the fuel cell 111 to generate electric power and then is exhausted as air offgas from the fuel cell 111 to the outside of the fuel cell system 101 through the air exhaust passage 162 and the diluter 182.

<Description of Integrated Valve>

Next, the integrated valve 181 to which the eccentric valve of the present invention is applied will be described below.

Figure 2:
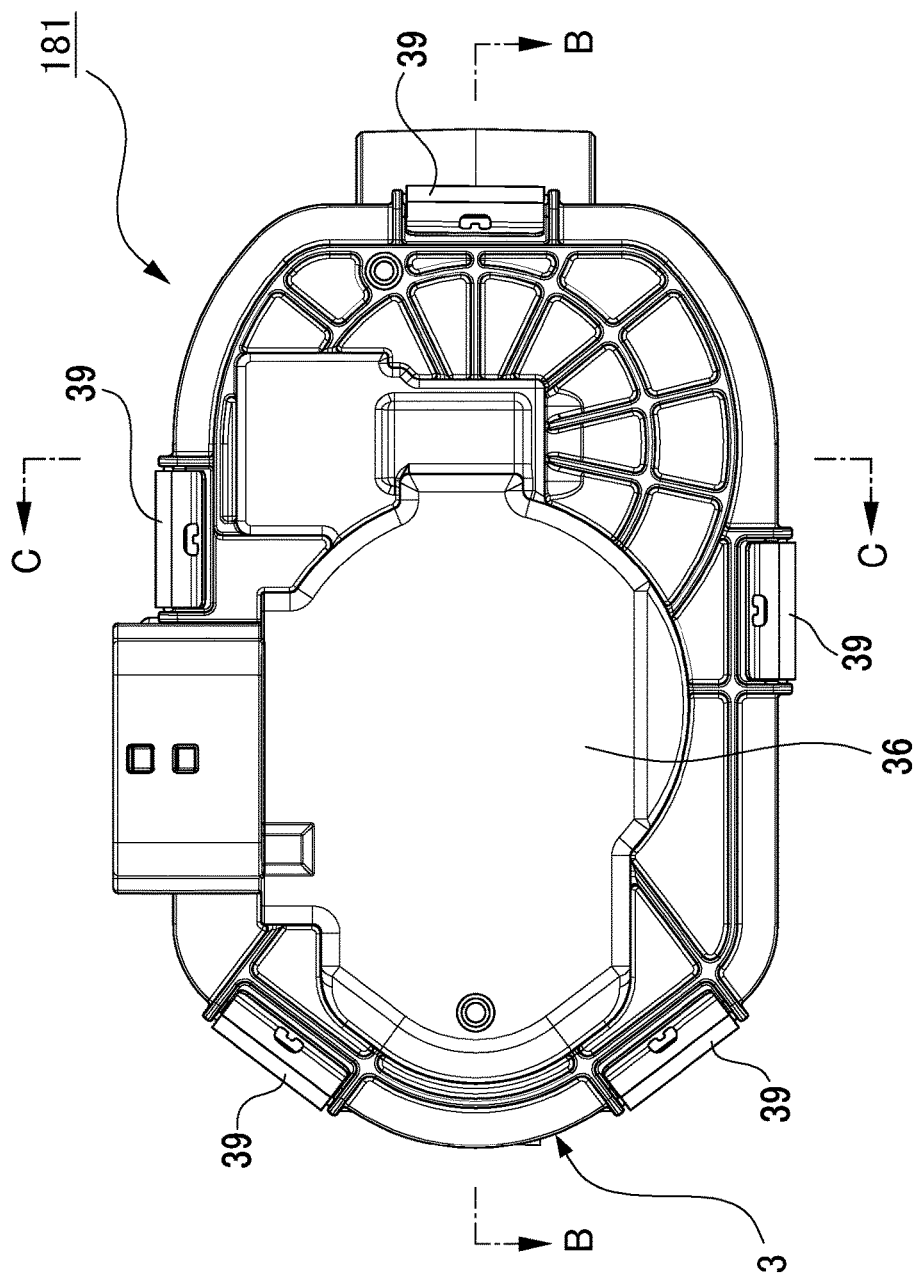
FIG. 2 is a front view of an integrated valve in an embodiment.
Figure 3:
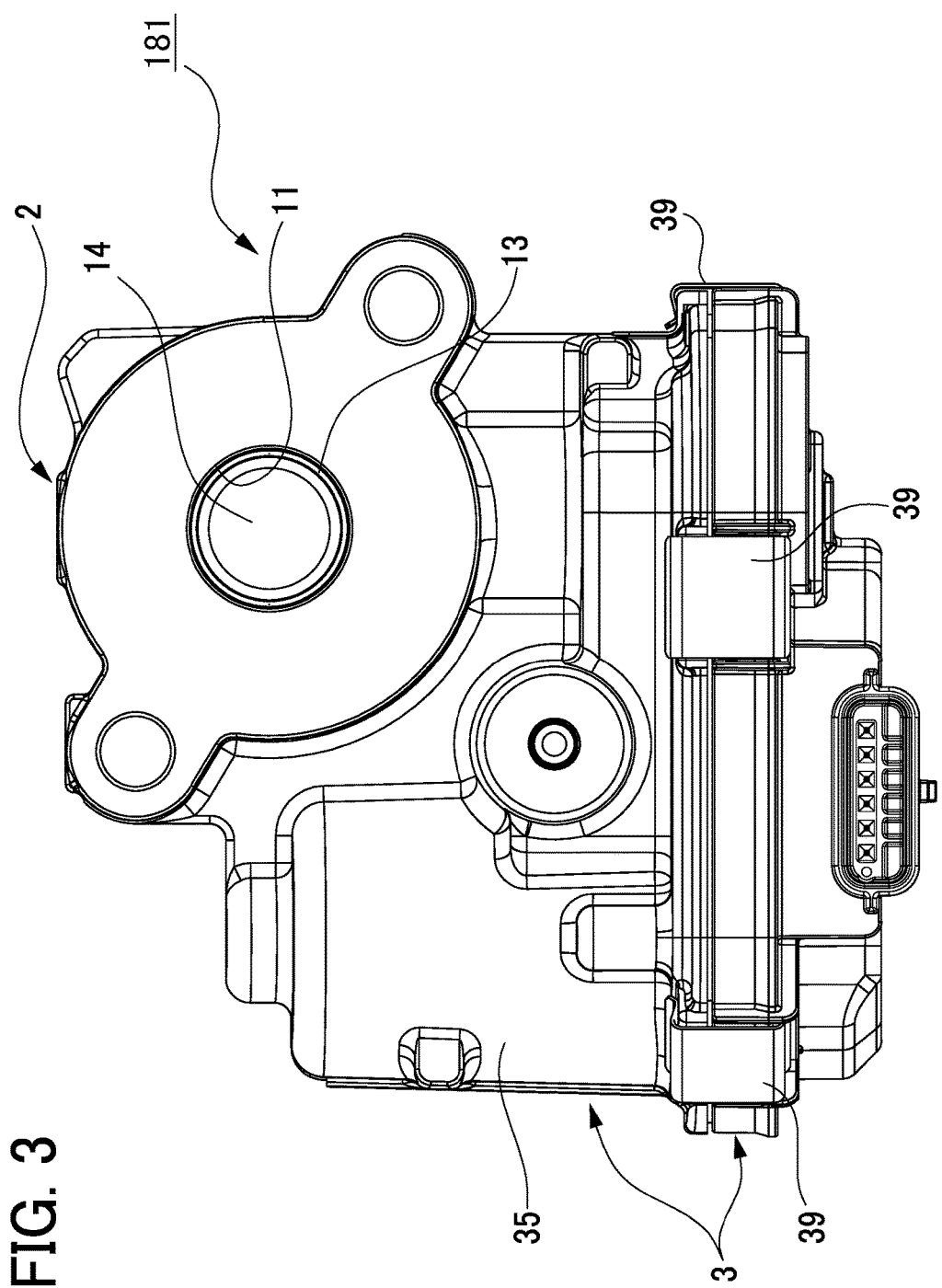
FIG. 3 is a top view of the integrated valve in the embodiment.

As shown in FIGS. 2 and 3, the integrated valve 181 is provided with a valve section 2 and a drive mechanism section 3. The valve section 2 includes a pipe part 12 (see FIG. 8) having a passage 11 for allowing air (atmospheric air) to flow. In this passage 11, there are placed a valve seat 13, a valve element 14, and a rotary shaft 15. The rotary shaft 15 receives driving force (torque) transmitted from the drive mechanism section 3. This drive mechanism section 3 includes a motor 32 and a speed-reducing mechanism 33 (see FIGS. 8 and 9).

Figure 4:
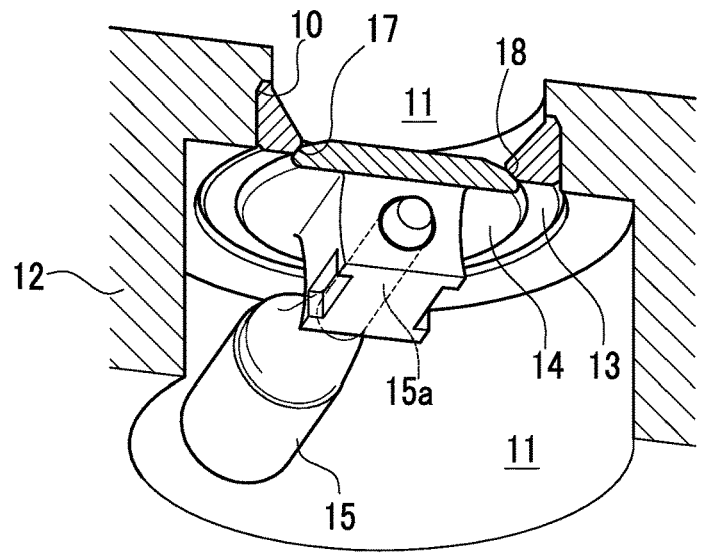
FIG. 4 is a partially-cutaway perspective view of a valve unit in a valve-closed state (a fully-closed state) where a valve element is in contact with a valve seat.
Figure 5:
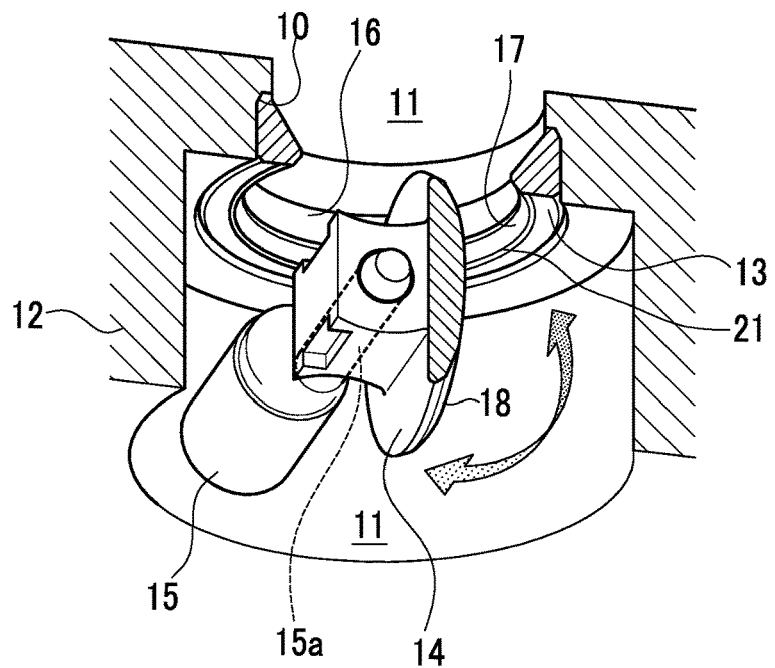
FIG. 5 is a partially-cutaway perspective view of the valve unit in a fully-open state where the valve element is separated furthest from the valve seat.

As shown in FIGS. 4 and 5, the passage 11 is formed with a recessed shoulder 10 in which the valve seat 13 is fitted. The valve seat 13 has a circular ring shape formed with a valve hole 16 at the center. The valve hole 16 is formed, on its circumferential edge, with an annular seat surface 17. The valve element 14 includes a circular disc-shaped portion whose outer periphery has an annular seal surface 18 corresponding to the seat surface 17. The valve element 14 is integrally provided with the rotary shaft 15 and rotatable together with the rotary shaft 15.

In the present embodiment, the valve seat 13 is provided with a rubber seat 21. The seat surface 17 is formed in this rubber seat 21. The details of the rubber seat 21 will be described later.

In the present embodiment, referring to FIGS. 4 and 5, the passage 11 formed on an opposite side to the valve element 14 and the rotary shaft 15 relative to the valve seat 13 is located on a side leading to the fuel cell stack 111 (on an upstream side of air flow), while the passage 11 formed on a side closer to the valve element 14 and the rotary shaft 15 relative to the valve seat 13 is located on a side leading to the diluter 182 (on a downstream side of air flow). In other words, in the present embodiment, the air flow in the passage 11 from the valve seat 13 side toward the valve element 14 (the rotary shaft 15) side.

Figure 6:
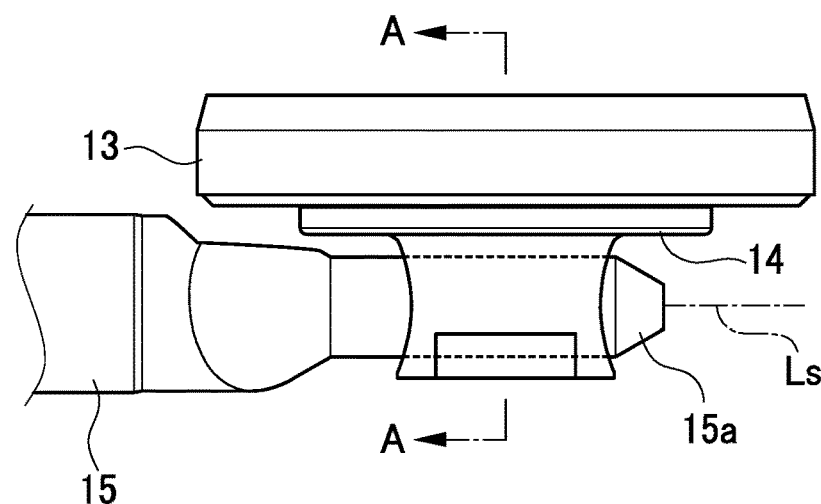
FIG. 6 is a side view of the valve seat, the valve element, and a rotary shaft in the fully-closed state of a flow control valve.
Figure 7:
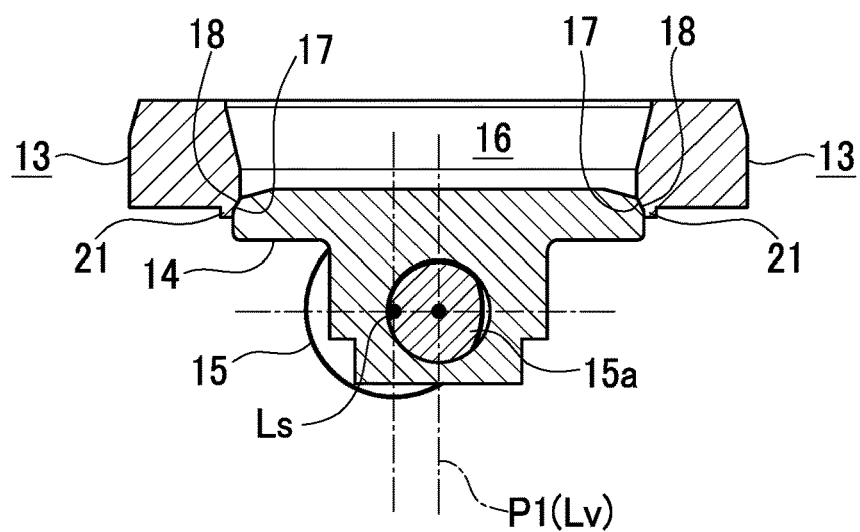
FIG. 7 is a cross-sectional view taken along a line A-A in FIG. 6.

As shown in FIGS. 6 and 7, the central axis Ls of the rotary shaft 15 extends in parallel to a radial direction of the valve element 14 (more concretely, the diameter of the disc-shaped portion of the valve element 14) and is positioned eccentrically from the central axis P1 of the valve hole 16 to one side in a radial direction of the valve hole 16. The seal surface 18 of the valve element 14 is positioned eccentrically from the central axis Ls of the rotary shaft 15 to an extending direction of the central axis Lv of the valve element 14.

By rotation of the valve element 14 about the central axis Ls of the rotary shaft 15, the valve element 14 is movable between a valve-closed position in which the seal surface 18 of the valve element 14 is in surface contact with the seat surface 17 (see FIG. 4) and a fully-open position in which the seal surface 18 is most away from the seat surface 17 (see FIG. 5).

Figure 8:
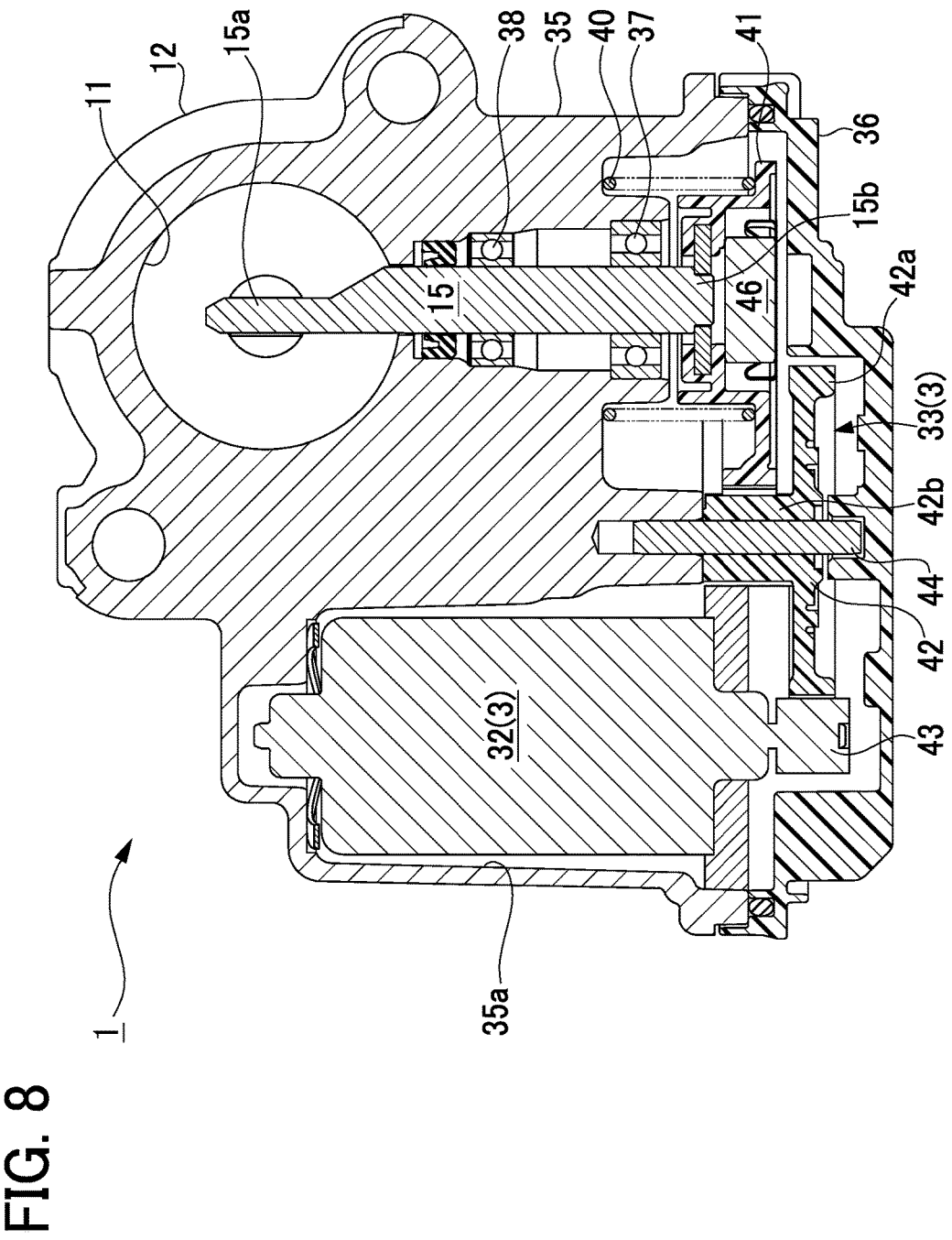
FIG. 8 is a cross-sectional view taken along a line B-B in FIG. 2.
Figure 9:
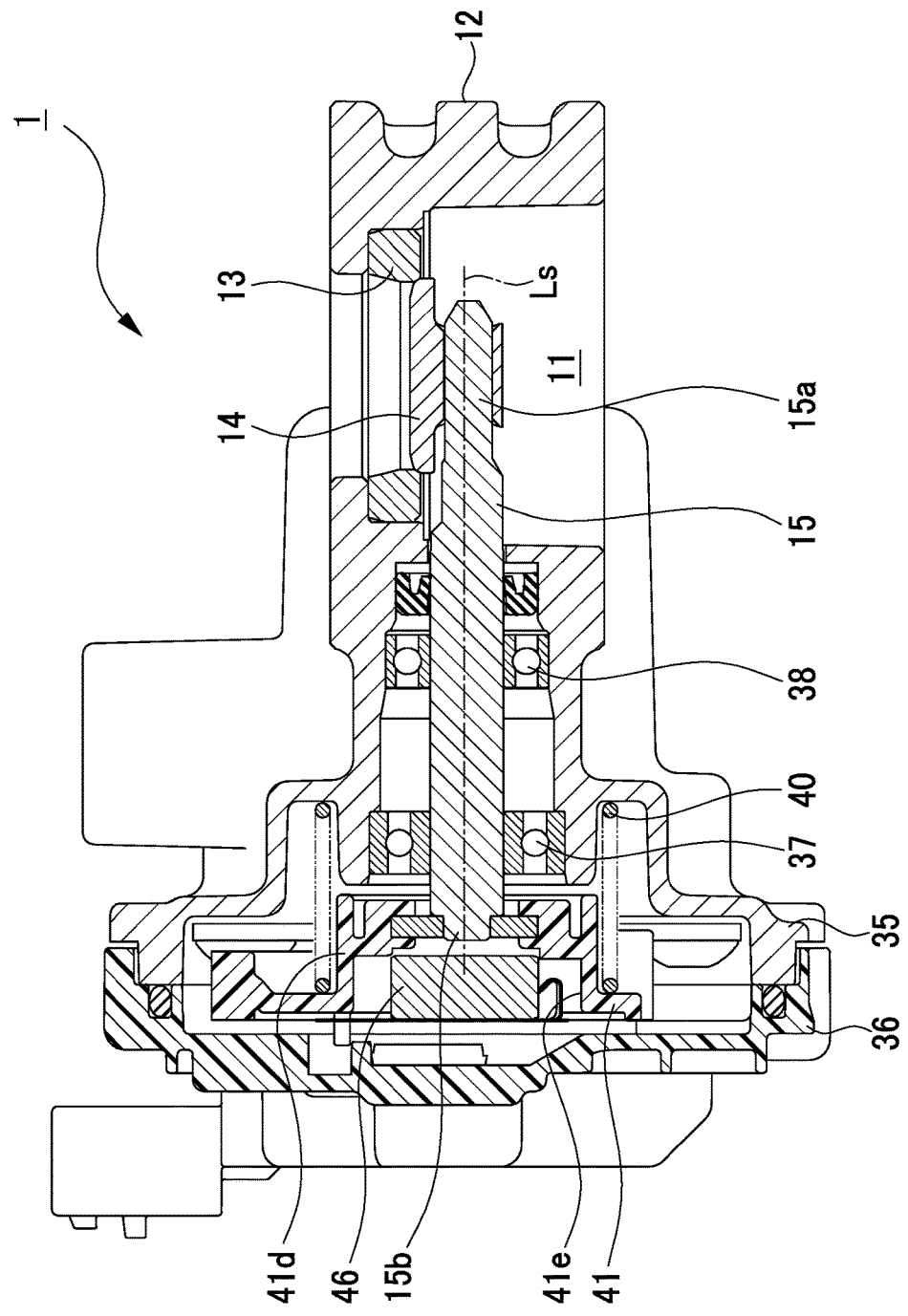
FIG. 9 is a cross-sectional view taken along a line C-C in FIG. 2.
Figure 10:
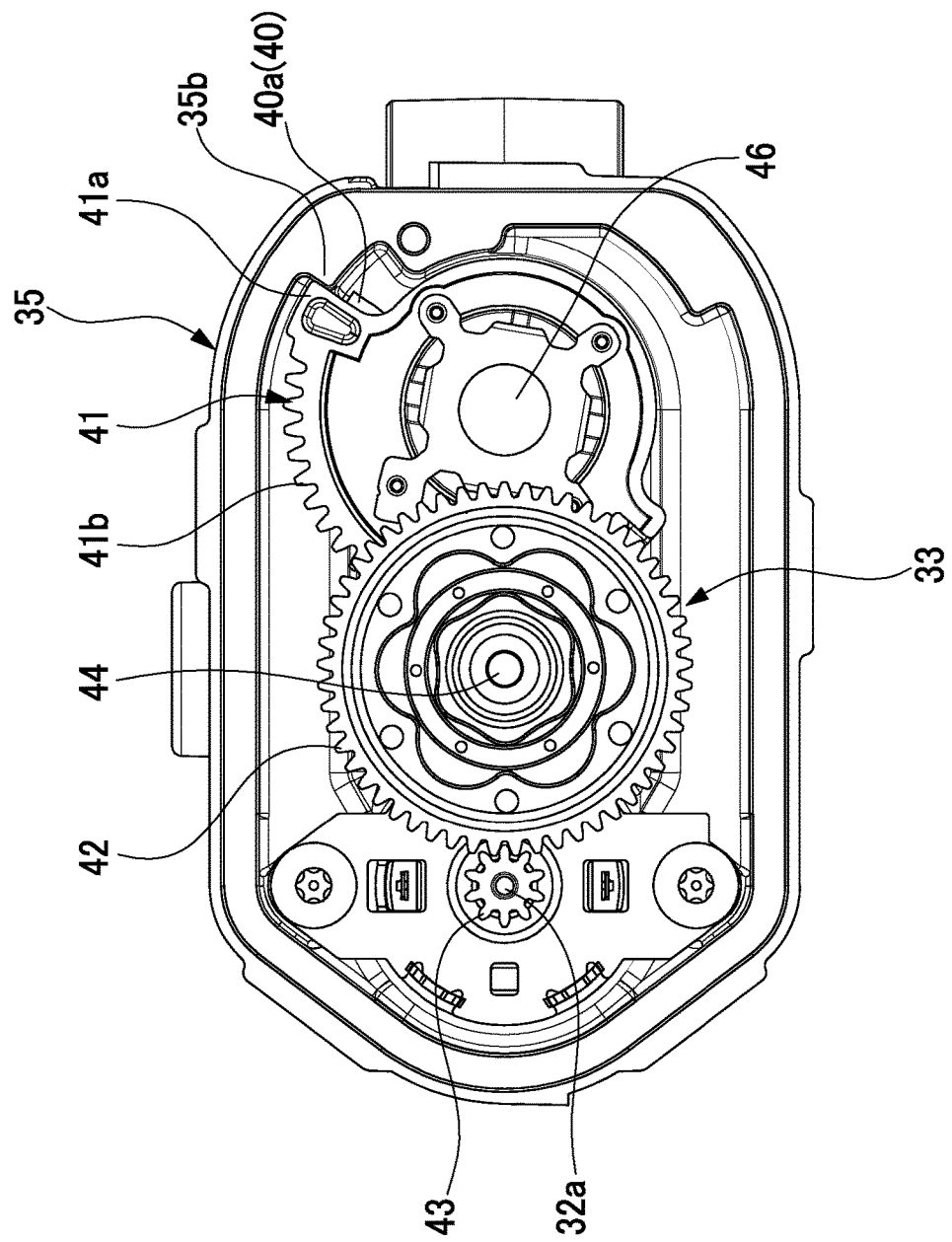
FIG. 10 is a front view showing a state where an end frame has been detached from a valve housing.

As shown in FIGS. 8 and 9, a valve housing 35 made of either metal or synthetic resin is provided with the passage 11 and the pipe part 12. An end frame 36 made of either meal or synthetic resin closes an open end of the valve housing 35. The valve element 14 and the rotary shaft 15 are placed in the valve housing 35. The rotary shaft 15 includes a pin 15a in its distal end portion. Specifically, the pin 15a is provided at one end of the rotary shaft 15 in a direction of the central axis Ls (on the side close to the valve element 14). The diameter of the pin 15a is smaller than the diameter of a portion of the rotary shaft 15 other than the pin 15a. At the other end of the rotary shaft 15 in the direction of the central axis Ls (on the side close to a main gear 41), there is provided with a proximal end portion 15b.

The distal end portion of the rotary shaft 15 formed with the pin 15a is a free distal end which is inserted and placed in the passage 11 of the pipe part 12. The rotary shaft 15 is supported in cantilever configuration through two bearings arranged apart from each other, that is, a first bearing 37 and a second bearing 38, so that the rotary shaft 15 is rotatable with respect to the valve housing 35. The first bearing 37 and the second bearing 38 are each constituted of a ball bearing. Those first and second bearings 37 and 38 are placed between the valve element 14 and the main gear 41 in the direction of the central axis Ls of the rotary shaft 15 to rotatably support the rotary shaft 15. In the present embodiment, the first bearing 37 is located at a position on a side close to the main gear 41 relative to the second bearing 38. The valve element 14 is fixed by welding to the pin 15a in the distal end portion of the rotary shaft 15 and is placed in the passage 11.

The end frame 36 is secured to the valve housing 35 with a plurality of clips 39 (see FIGS. 2 and 3). As shown in FIGS. 8 and 9, the main gear 41 provided with a fan-shaped gear is fixed to the proximal end portion 15b of the rotary shaft 15. A return spring 40 that generates a return spring force Fs1 (see FIG. 12) is provided between the valve housing 35 and the main gear 41. The return spring force Fs1 is a force to rotate the rotary shaft 15 in a valve-closing direction and to urge the valve element 14 to a closing direction (that is, toward a position at which the valve opening degree θ which will be described later is "0").

Figure 19:
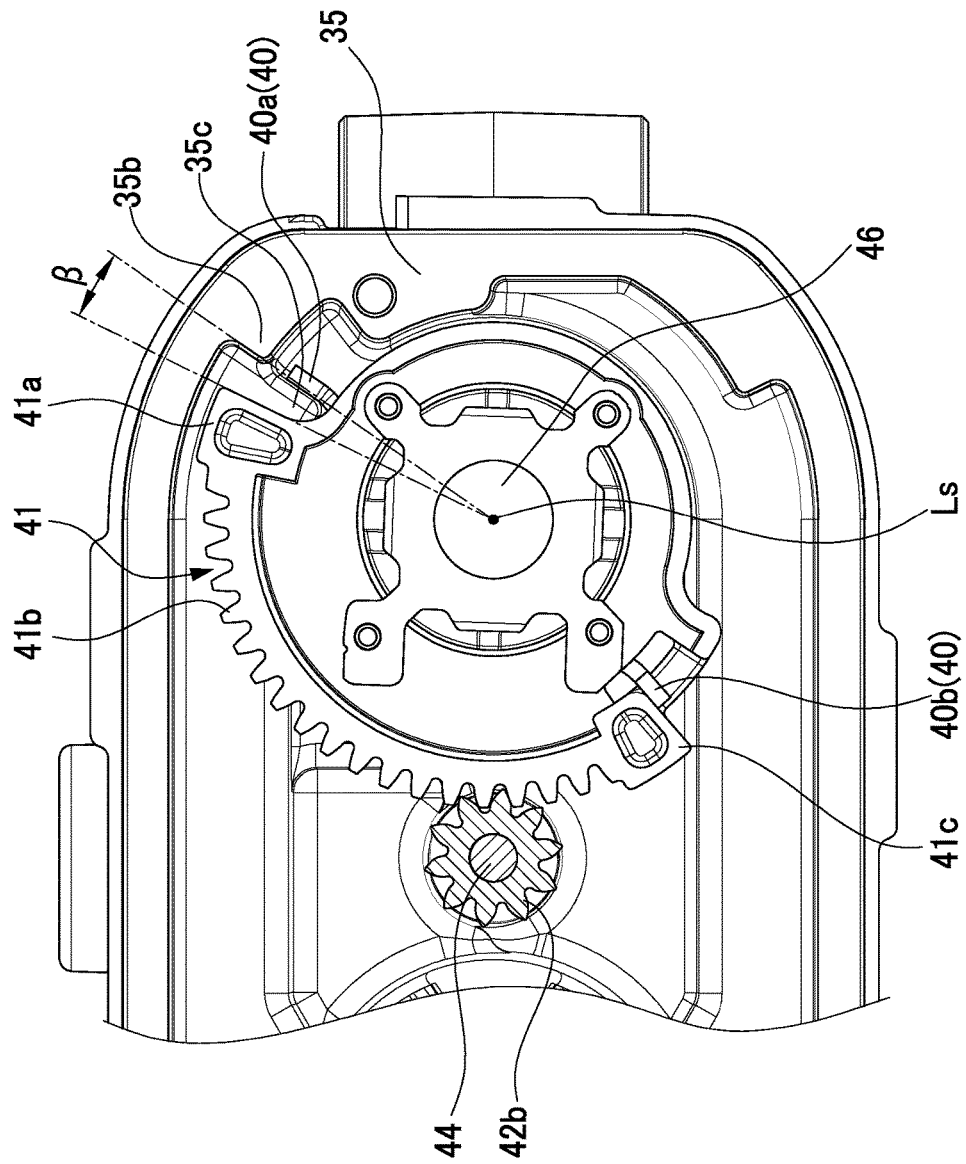
FIG. 19 is an enlarged view (a partially-cutaway view) of the main gear, the return spring, the intermediate gear, and their surrounding parts at a valve opening degree of β during operation of the motor.

The return spring 40 is an elastic member made of wire wound in a coil shape and is provided, at both ends, with a far-side hook 40a and a near-side hook 40b. The far-side hook 40a and the near-side hook 40b are spaced at an interval of about 180° in a circumferential direction of the return spring 40. The far-side hook 40a is located on a valve housing 35 side (on a far-side of a drawing sheet of FIG. 11) so that it contacts a spring hook part 35c (see FIG. 19) of the valve housing 35. In contrast, the near-side hook 40b is located on a main gear 41 side (on a near-side of the drawing sheet of FIG. 11) so that it contacts a spring hook part 41c of the main gear 41.

As shown in FIGS. 8 to 11, the main gear 41 includes a full-close stopper part 41a, a gear part 41b, the spring hook part 41c, a spring guide part 41d, and others. In the circumferential direction (a counterclockwise direction in FIG. 11) of the main gear 41, the full-close stopper part 41a, the gear part 41b, and the spring hook part 41c are arranged in this order. The main gear 41 is integrally provided with the rotary shaft 15 and is configured to receive drive force generated by the motor 32. The full-close stopper part 41a is a part that abuts on the full-close stopper part 35b of the valve housing 35 when a valve opening degree θ is 0. The main gear 41 is one example of a "drive force receiving part" in the present invention.

The valve opening degree θ is a rotation angle of the rotary shaft 15 rotated about the central axis Ls and corresponds to a rotation angle of the main gear 41, and an opening angle of the valve element 14. In other words, the time when the valve opening degree θ is 0 represents the time when the rotation angle of the rotary shaft 15 is a minimum angle within a rotatable range of the rotary shaft 15. FIGS. 8 to 11 show the time when the valve opening degree θ is 0.

Figure 11:
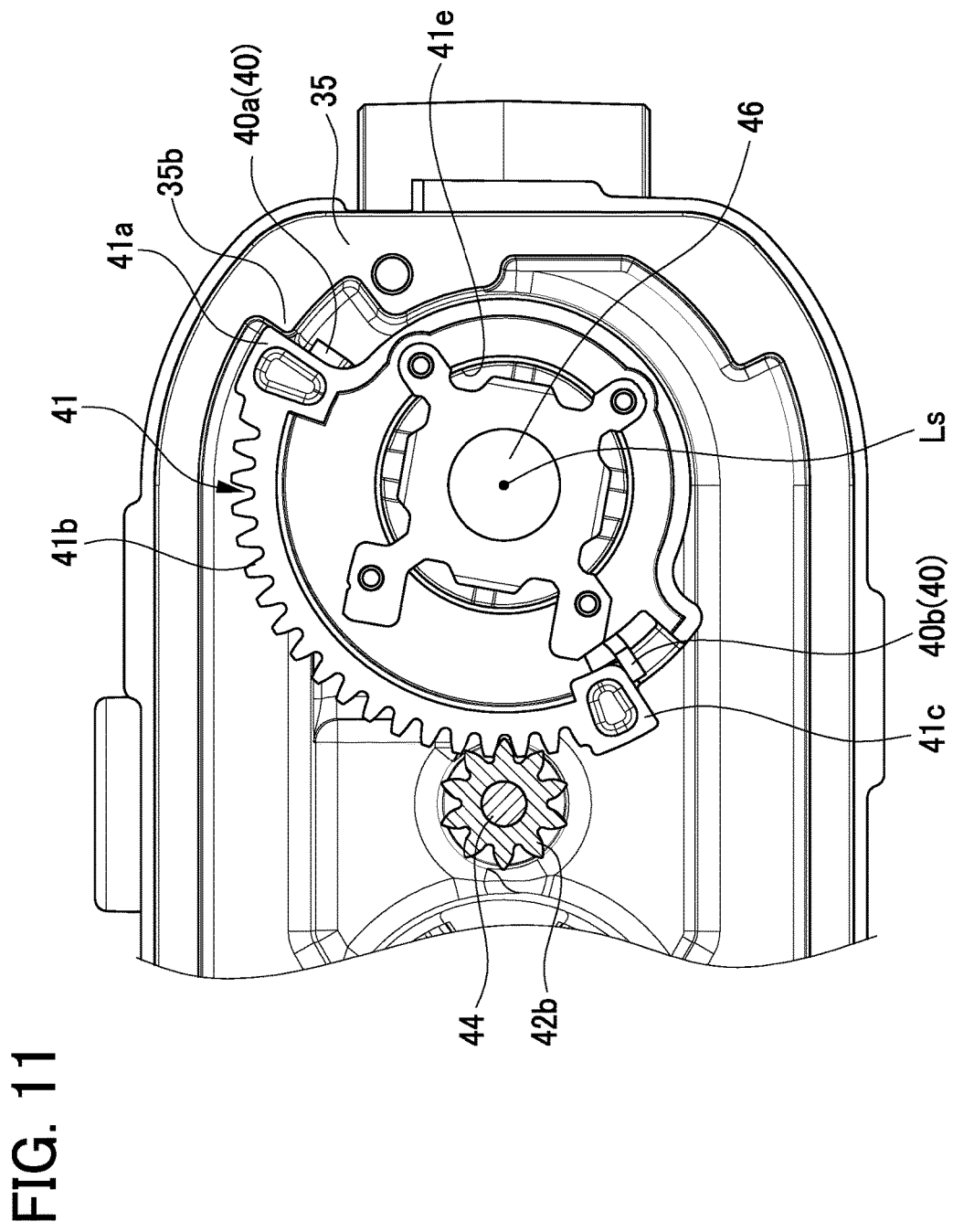
FIG. 11 is an enlarged view (a partially-cutaway view) of a main gear, a return spring, and an intermediate gear during non-operation of a motor.

As shown in FIG. 11, the gear part 41b meshes with a small-diameter gear 42b of an intermediate gear 42. The spring hook part 41c contacts with the near-side hook 40b of the return spring 40 and receives the return spring force Fs1 from the near-side hook 40b (see FIG. 12).

As shown in FIG. 9, the spring guide part 41d is placed in the coiled return spring 40 to support the return spring 40. The spring guide part 41d is provided integral with the rotary shaft 15 at a portion located close to the proximal end 15b of the rotary shaft 15.

The main gear 41 includes a recess 41e in which a magnet 46 having a substantially disk shape is mounted as shown in FIG. 9. Therefore, when the main gear 41 rotates together with the valve element 14 and the rotary shaft 15, the magnet 46 is also rotated, changing a magnetic field of the magnet 46. This change in the magnetic field of the magnet 46 is detected by a rotation angle sensor (not illustrated), so that the rotation angle of the main gear 41 is detected as the opening degree of the valve element 14, that is, the opening degree of the main gear 41.

As shown in FIG. 8, the motor 32 is accommodated and fixed in a holding cavity 35a formed in the valve housing 35. The motor 32 generates a drive force to rotate the rotary shaft 15 in a valve opening direction and in a valve closing direction. The motor 32 is drivingly coupled to the rotary shaft 15 through the speed reducing mechanism 33 to operate the valve element 14 to open and close. Specifically, an output shaft 32a (see FIG. 10) of the motor 32 is fixedly provided with a motor gear 43. This motor gear 43 is drivingly coupled to the main gear 41 through the intermediate gear 42 to transmit the drive force.

The intermediate gear 42 is a double gear having a large-diameter gear 42a and the small-diameter gear 42b and is rotatably supported by the valve housing 35 through a pin shaft 44. The diameter of the large-diameter gear 42a is larger than the diameter of the small-diameter1 gear 42b. The large-diameter gear 42a is drivingly engaged with the motor gear 43, while the small-diameter gear 42b is drivingly engaged with the main gear 41. In the present embodiment, each of the main gear 41, the intermediate gear 42, the motor gear 43, constituting the speed reducing mechanism 33, is made of resin material. Weight saving is thus achieved in the present embodiment.

The motor 32 is one example of a "drive mechanism" in the present invention. Further, the intermediate gear 42 (a drive transmission part) transmits the drive force of the motor 32 to the rotary shaft 15.

In the integrated valve 181 configured as above, even though the details will be mentioned later, when the motor 32 is energized from such a valve-closed state as shown in FIG. 4 (a state where the entire circumference of the seal surface 18 of the valve element 14 is in contact with the entire circumference of the seat surface 17 of the valve seat 13), the force pushing the gear teeth (the motor drive force Fm1 (see FIG. 14)) is exerted on the main gear 41, thereby moving the valve element 14 in a direction toward the valve seat 13 by the principle of leverage (see FIG. 15). Thereafter, when the drive voltage (current) applied to the motor 32 is gradually raised, the output shaft 32a and the motor gear 43 are rotated in a forward direction (i.e., a direction to open the valve element 14) and this rotation is reduced in speed by the intermediate gear 42 and then transmitted to the main gear 41. Accordingly, the valve element 14 is opened against the return spring force Fs1 that is generated by the return spring 40 and that urges the valve element 14 in the valve closing direction, thus opening the flow passage 11 (see FIGS. 16 and 18). Thereafter, when the drive voltage applied to the motor 32 is maintained at a constant level in the process of opening the valve element 14, the motor drive force Fm1 and the return spring force Fs1 become balanced with each other at the opening degree of the valve element 14 at that time, so that the valve element 14 is held at a predetermined opening degree.

More details of the operations of the integrated valve 181 in the present embodiment will be described below. During non-operation of the motor 32 that is not energized (i.e., while the motor 32 is stopped), the valve opening degree θ is 0, that is, the integrated valve 181 is in the valve-closed state. At that time, as shown in FIG. 11, the full-close stopper part 41a of the main gear 41 contacts with the full-close stopper part 35b of the valve housing 35.

Figure 12:
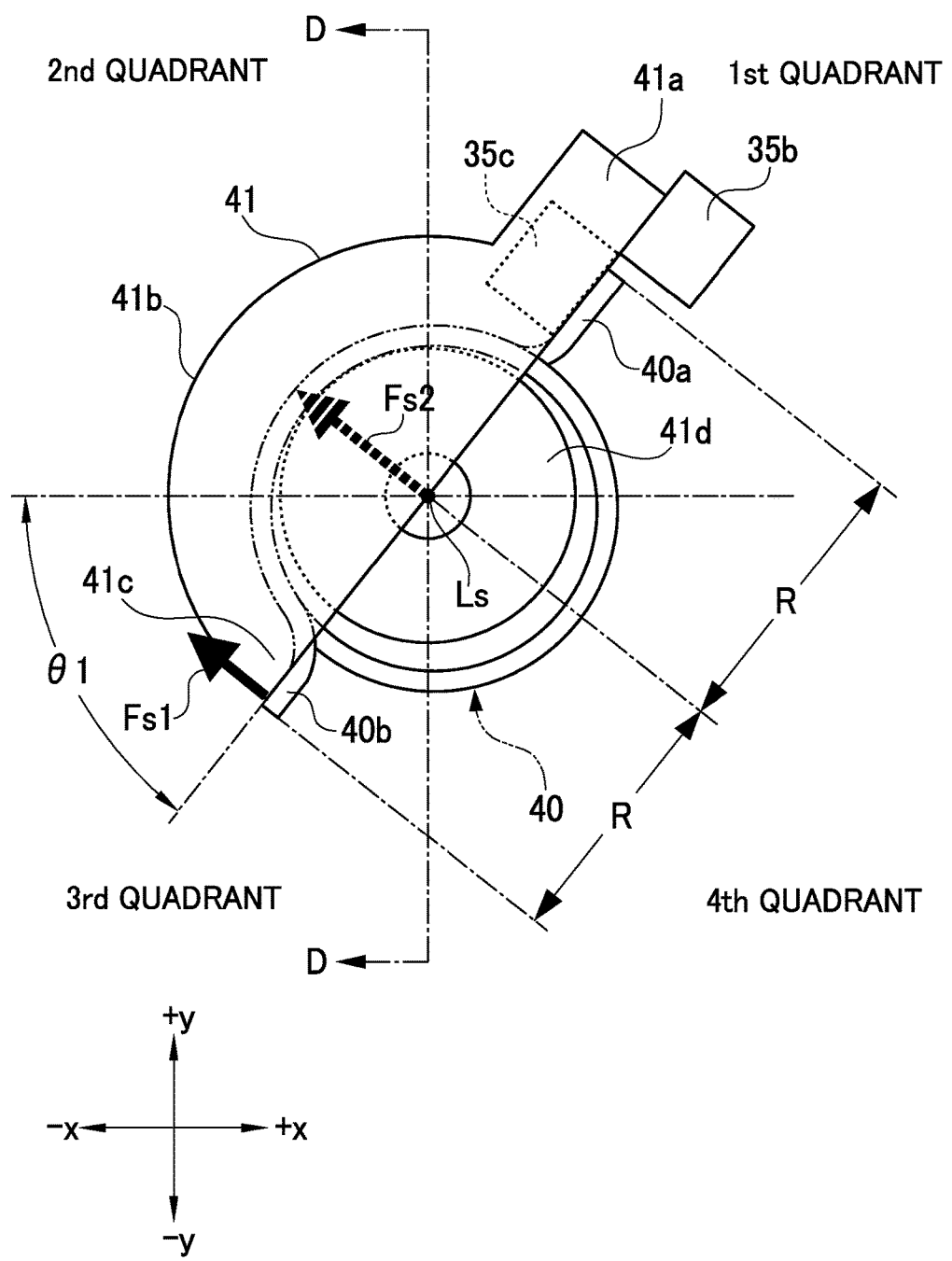
FIG. 12 is a schematic view showing forces acting on the main gear during non-operation of the motor and seen from a main gear side in a central axis direction of a rotary shaft.

In this regard, the relationship of forces in terms of a circumferential direction of, or around, the rotary shaft 15 is considered as below. As shown in FIG. 12, the spring hook part 41c of the main gear 41 receives the return spring force Fs1 from the near-side hook 40b of the return spring 40. As shown in FIG. 12, in a rectangular or Cartesian coordinate system consisting of an origin represented by the central axis Ls of the rotary shaft 15, an x-axis represented by a horizontal line, and a y-axis represented by a vertical line, a first quadrant is a part defined by a +x axis and a +y axis, a second quadrant is a part defined by a −x axis and the +y axis, a third quadrant is a part defined by the −x axis and a −y axis, and a fourth quadrant is a part defined by the +x axis and the −y axis. At that time, the far-side hook 40a and the full-close stopper part 41a are placed in a position corresponding to the first quadrant, and the near-side hook 40b and the spring hook part 41c are placed in a position corresponding to the third quadrant.

Herein, based on the principle of leverage, a fulcrum, or a pivot point, is set in the full-close stopper part 41a, a point of effort is set in the spring hook part 41c, and a point of load is set in a middle part between the full-close stopper part 41a and the spring hook part 41c. Thus, the return spring force Fs1 applied to the spring hook part 41c causes a force Fs2 to act on the middle part between the full-close stopper part 41a and the spring hook part 41c. This is expressed by: "Force Fs2"=2×"Return spring force Fs1". In FIG. 12, the distance between the full-close stopper part 41a and the spring hook part 41c is set to "2R".

Figure 13:
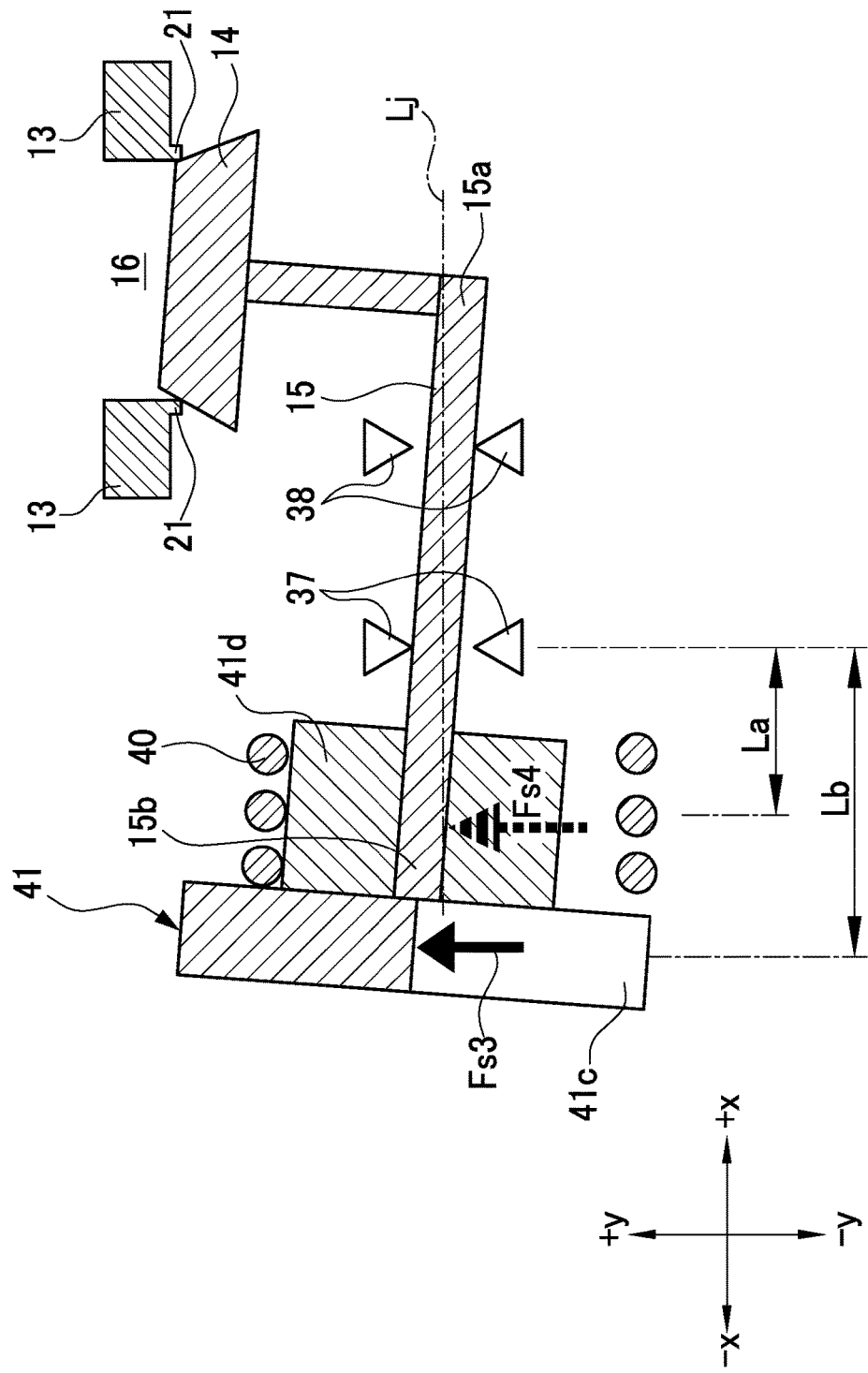
FIG. 13 is a schematic view representing the valve seat, the valve element, the rotary shaft, bearings, and the main gear, showing a cross-sectional view taken along a line D-D in FIG. 12.

At that time, the relationship of forces in terms of a cross section of the rotary shaft 15 taken along the central axis Ls is also considered as below. A +y direction component of the force Fs2 is a component force Fs3 as shown in FIG. 13. The +y direction represents a direction perpendicular to the central axis Lj direction of the first bearing 37 and the second bearing 38 (the x direction) and a direction toward which the valve seat 13 is placed relative to the valve element 14 (an upward direction in the drawing sheets of FIGS. 12 and 13). This is expressed by: "Component force Fs3"="Force Fs2"×"sin θ1". The angle θ1 is an angle formed between the arrangement direction in which the full-close stopper part 41a and the spring hook part 41c are arranged and the x direction as shown in FIG. 12.

This component force Fs3 causes a force Fs4 (separating-direction urging force) to act on the spring guide part 41d in the +y direction. This is expressed by: "Force Fs4"="Component force Fs3"×Lb/La. In this way, the force Fs4 is a force that is caused by the return spring force Fs1 and acts in a direction perpendicular to the central axis Lj of the first bearing 37 and the second bearing 38. The distance La is a distance from a position in which the first bearing 37 is placed to a position on which the force Fs4 acts in the x direction. The distance Lb is a distance from the position where the first bearing 37 is placed to a position on which the force Fs3 acts in the x direction.

When the force Fs4 acts in the +y direction at the position of the spring guide part 41d, the rotary shaft 15 integral with the spring guide part 41d is caused to turn and incline clockwise in FIG. 13 about the first bearing 37 serving as the fulcrum. Accordingly, by the principle of leverage, the main gear 41 provided in the proximal end 15b of the rotary shaft 15 is moved in the +y direction, while the valve element 14 provided on the pin 15a of the rotary shaft 15 is moved in the −y direction. Therefore, the valve element 14 is moved in a direction away from the valve seat 13 (a separating direction). In the above manner, during the time when the motor 32 is not operated and the integrated valve 181 is in the valve closed state, the valve element 14 is moved by the force Fs4 in a direction to separate from the valve seat 13. At that time, the rotary shaft 15 is stopped by the second bearing 38.

Figure 21:
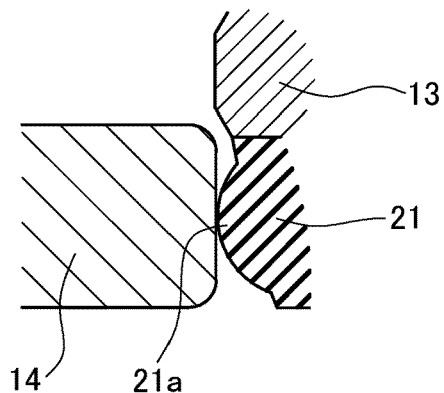
FIG. 21 is a view showing a rubber seat.

In the present embodiment, at that time, the valve element 14 is in contact with the rubber seat 21 (a sealing member) provided in the valve seat 13 as shown in FIG. 13. More concretely, as shown in FIG. 21, the valve element 14 contacts the leading end of a deformable portion 21a (a bead portion) of the rubber seat 21. In this state, the valve element 14 is in contact with the leading end of the deformable portion 21a over its entire circumference and the deformable portion 21a is only deformed by a slight amount. In this manner, since the rubber seat 21 seals between the valve seat 13 and the valve element 14, the integrated valve 181 can enhance the sealing property with a simple structure. Herein, the integrated valve 181 is demanded for a sealing function to avoid suction of air into the fuel cell 111 during stop of a vehicle in which the fuel cell system 101 is mounted. In the present embodiment, for such a demanded sealing function of the integrated valve 181, the rubber seat 21 seals between the valve seat 13 and the valve element 14.

Figure 20:
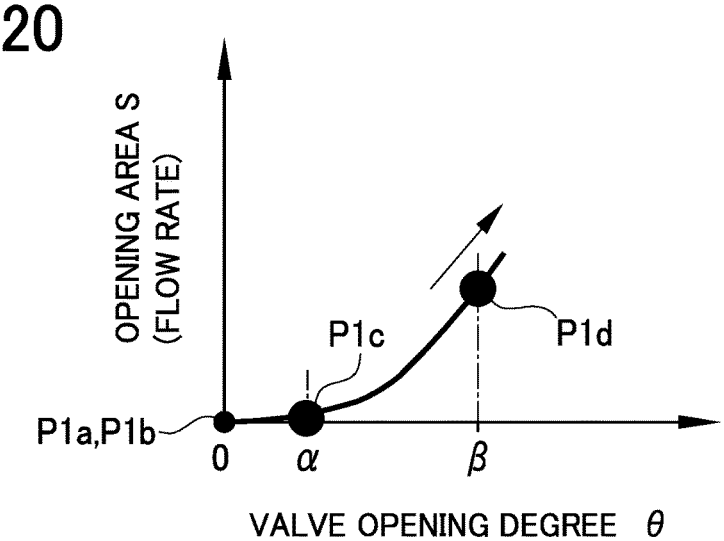
FIG. 20 is a graph showing a relationship between valve opening degree and open area.

At that time, furthermore, the valve element 14 is located at a position represented by a point P1a in FIG. 20 showing the relationship between the valve opening degree $\theta$ and the open area S. Herein, the time "when the integrated valve 181 is in a valve-closed state" represents the time when the valve opening degree $\theta$ (the opening degree of the valve element 14) is $\theta$, that is, the time when the rotation angle of the rotary shaft 15 is an angle during full closing (the minimum angle within the rotatable angle of the rotary shaft 15).

Figure 14:
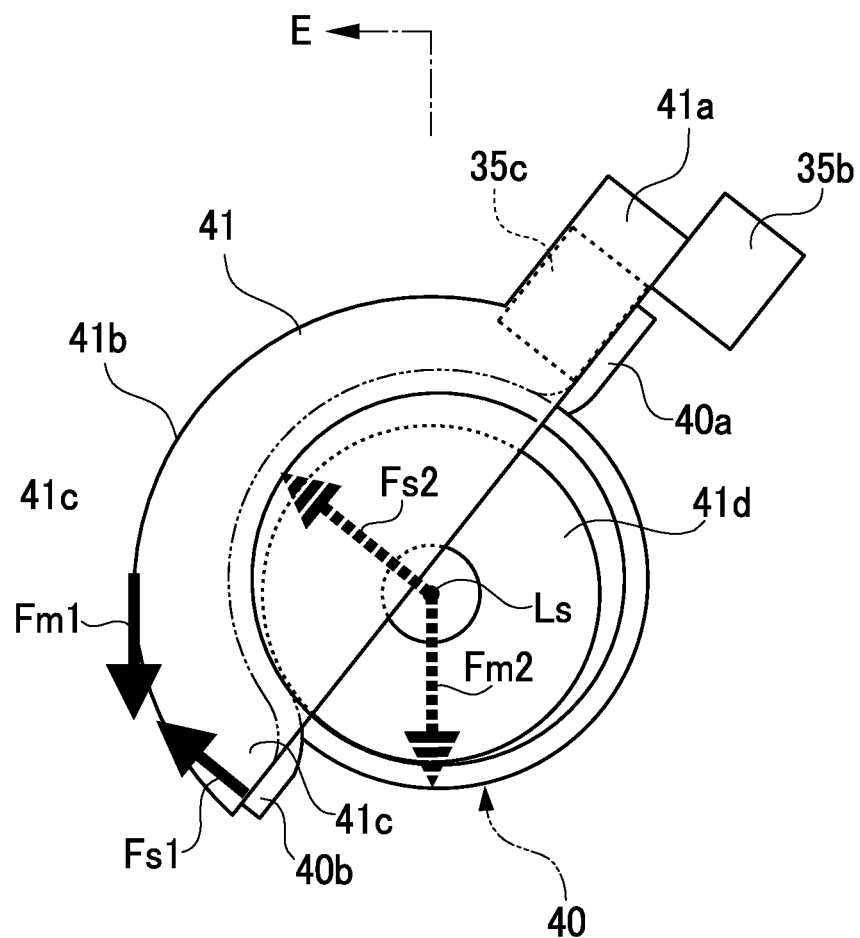
FIG. 14 is a schematic view showing forces acting on the main gear during operation of the motor and seen from the main gear side in the central axis direction of the rotary shaft.

Thereafter, during operation of the motor 32, namely, when the motor 32 is energized, the motor drive force Fm1 acts from the small-diameter gear 42b (see FIG. 11) of the intermediate gear 42 to the gear part 41b (see FIG. 11) to rotate the main gear 41. When seen from the force relationship in terms of the circumferential direction of the rotary shaft 15 at that time, the motor drive force Fm1 acts in the −y direction as shown in FIG. 14. This −y direction is a perpendicular direction to the central axis Lj direction (the x direction) of the first bearing 37 and the second bearing 38 and corresponds to a direction toward which the valve element 14 is placed relative to the valve seat 13 (a downward direction in the drawing sheets of FIGS. 12 and 13).

The motor drive force Fm1 causes a force Fm2 to act in the −y direction at the position of the central axis Ls of the rotary shaft 15. Further, when seen from the force relationship in terms of the cross section of the rotary shaft 15 taken along the central axis Ls, a force Fm3 (seating-direction urging force) acts in the −y direction at the position of the spring guide part 41d as shown in FIG. 15. This is expressed by: "Force Fm3"="Force Fm2"×Lb/La. During operation of the motor 32, in the above manner, the force Fm3 is generated. This force Fm3 is a force that is caused by the motor drive force Fm1 and that acts in a direction perpendicular to the central axis Lj of the first bearing 37 and the second bearing 38. The force Fm3 causes the rotary shaft 15 to turn and incline about the first bearing 37 serving as the fulcrum, thereby urging the valve element 14 in a direction toward the valve seat 13.

Figure 15:
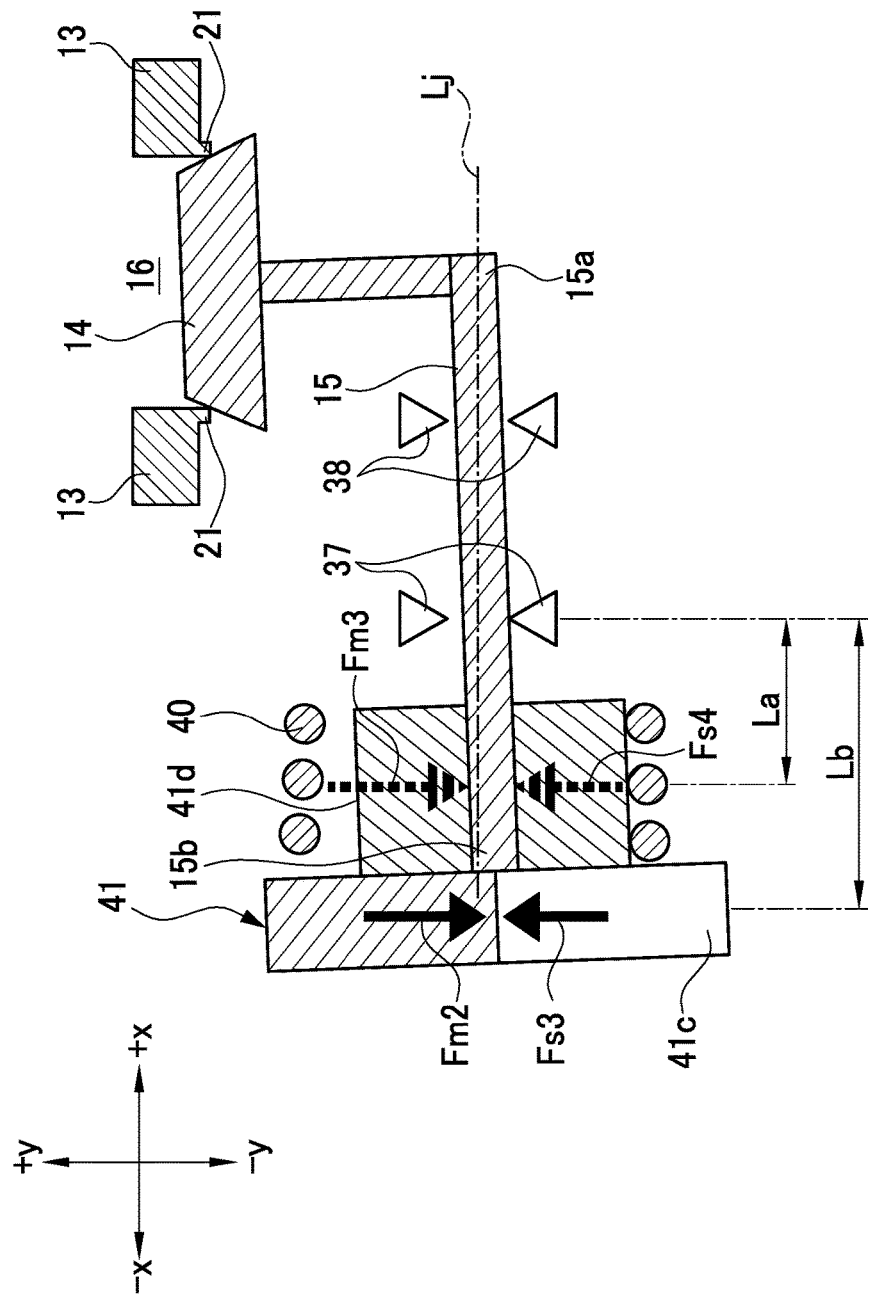
FIG. 15 is a schematic view representing the valve seat, the valve element, the rotary shaft, the bearings, and the main gear, showing a cross-sectional view taken along a line E-E in FIG. 14.

As shown in FIG. 15, when the force Fm3 becomes larger than the force Fs4, the rotary shaft 15 integral with the spring guide part 41d of the main gear 41 is caused to turn and incline counterclockwise in FIG. 14 about the first bearing 37 serving as the fulcrum. Accordingly, by the principle of leverage, the main gear 41 is moved in the −y direction, while the valve element 14 moves in the +y direction. Therefore, the valve element 14 is moved in a direction toward the valve seat 13 (a seating direction) by the force Fm3.

In the present embodiment, at that time, the deformable portion 21a of the rubber seat 21 is pressed and deformed by the valve element 14. However, a deformation amount of this deformable portion 21a is smaller than a deformation amount of the deformable portion 21a when it is plastically deformed. That is, the deformable portion 21a is elastically deformed, but is not plastically deformed.

At that time, the valve element 14 is located at a position represented by a point P1b in FIG. 20 showing the relationship between the valve opening degree $\theta$ and the open area S.

Figure 16:
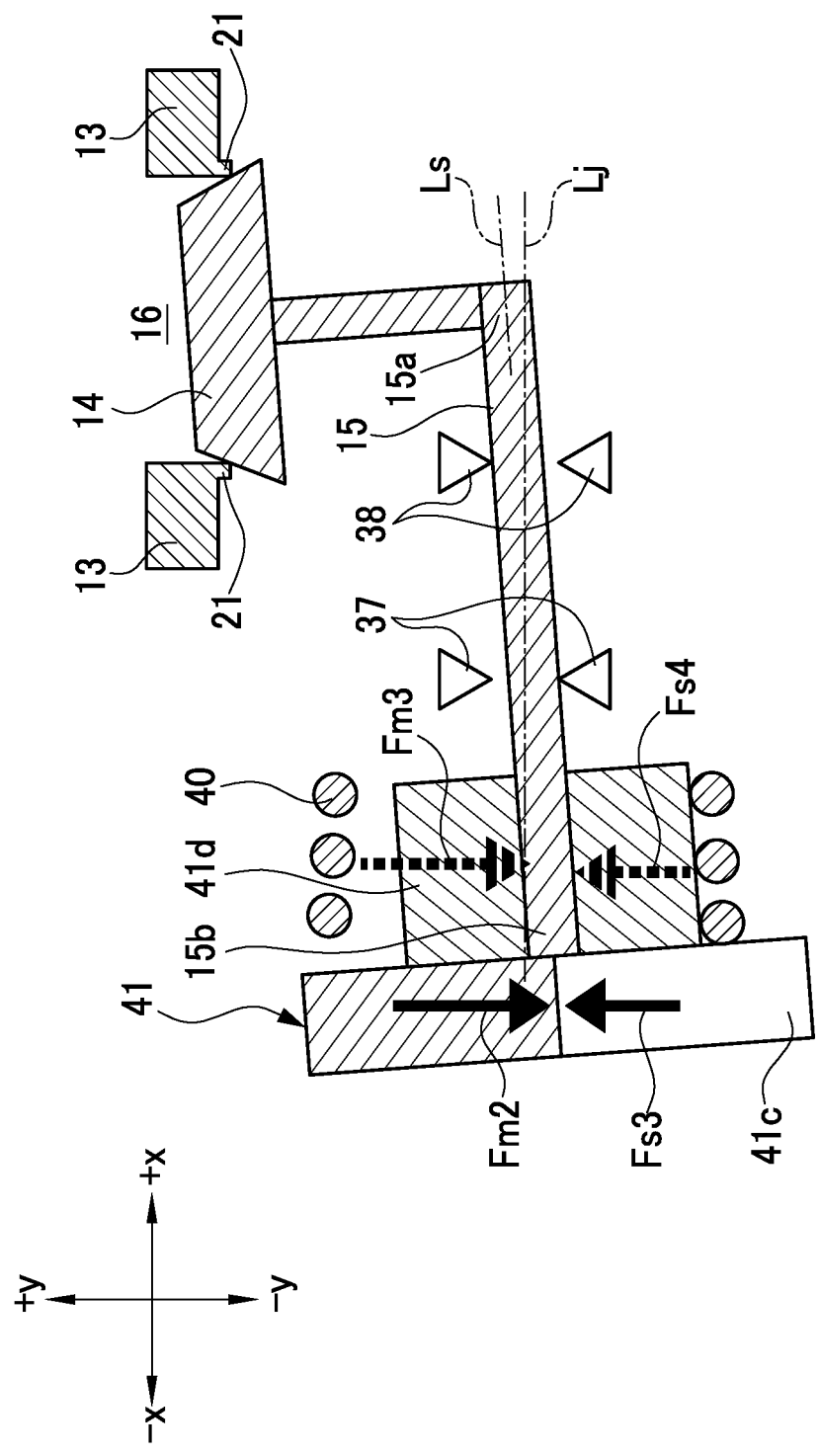
FIG. 16 is a diagram corresponding to FIG. 15, and representing a case where a motor drive force is set larger than that in FIG. 15.
Figure 17:
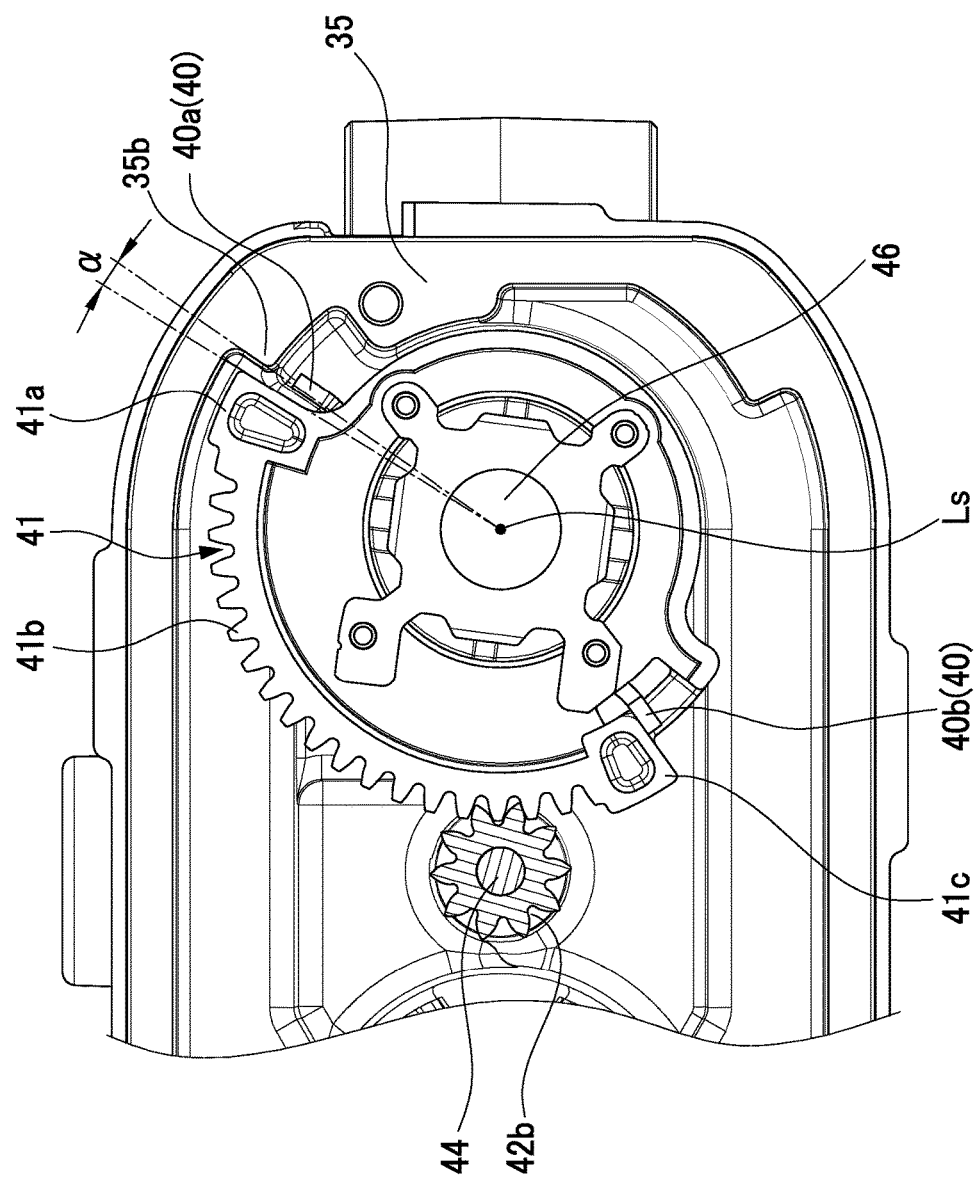
FIG. 17 is an enlarged view (a partially-cutaway view) of the main gear, the return spring, the intermediate gear, and their surrounding parts at a valve opening degree of α during operation of the motor.

Thereafter, when the drive voltage to be applied to the motor 32 rises and thus the motor drive force Fm1 become large, the rotary shaft 15 is caused to further turn and incline counterclockwise in FIG. 16 about the first bearing 37 serving as the fulcrum. Accordingly, the main gear 41 is further moved in the −y direction, while the valve element 14 is further moved in the +y direction. At that time, the rotary shaft 15 is rotated about the central axis Ls, so that the valve opening degree $\theta$ (the rotation angle of the rotary shaft 15) becomes "a" (see FIG. 17) and the open area S increases. In this state, the full-close stopper part 41a of the main gear 41 separates from the full-close stopper part 35b of the valve housing 35 as shown in FIG. 17. The rotary shaft 15 is stopped by the second bearing 38 as shown in FIG. 16. The valve element 14 at that time is located at a position represented by a point P1c in FIG. 20 showing the relationship between the valve opening degree $\theta$ and the open area S.

Figure 18:
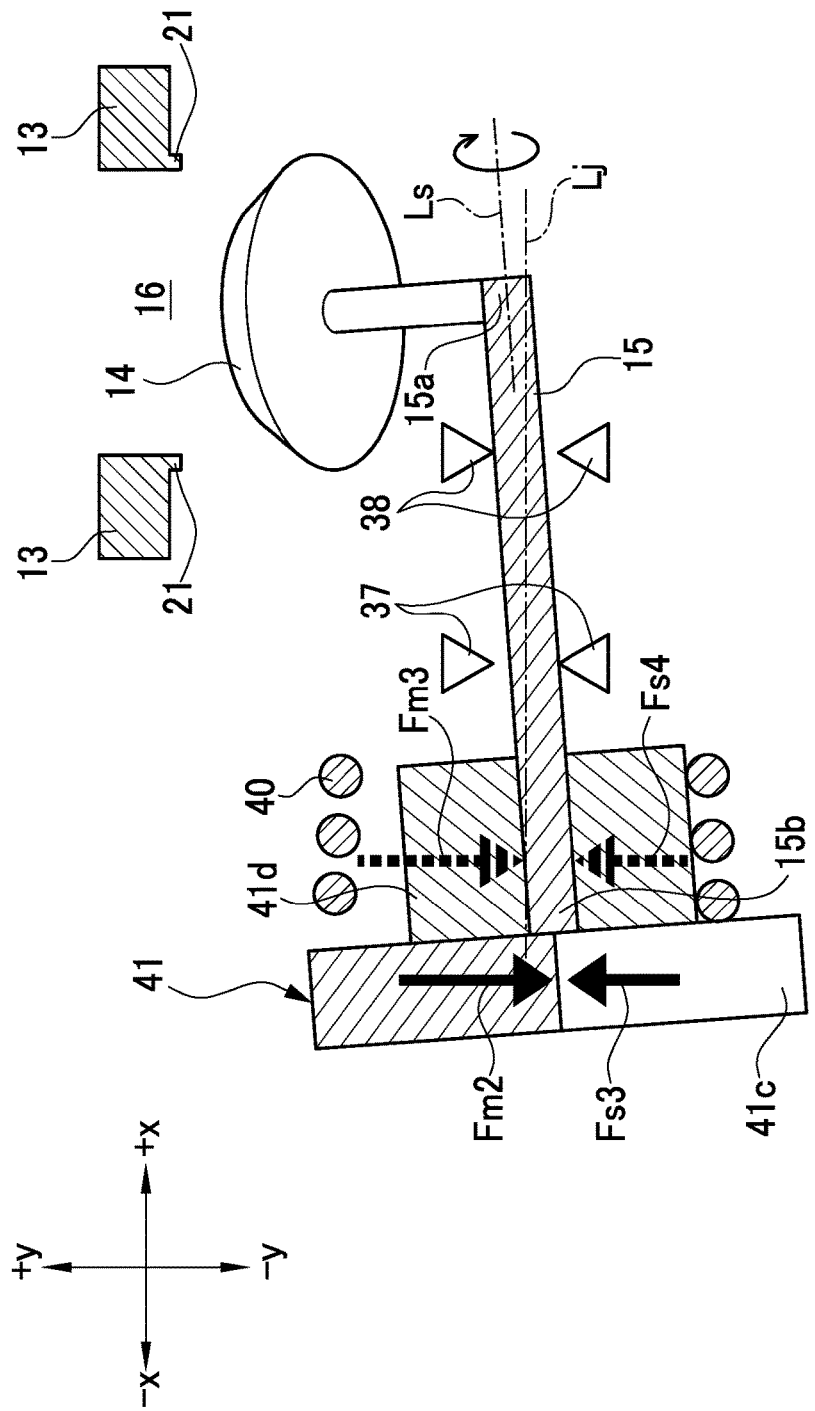
FIG. 18 is a diagram corresponding to FIG. 16, and representing a case where a motor drive force is set larger than that in FIG. 16.

Thereafter, as the motor drive force Fm1 further becomes larger, the rotary shaft 15 is further rotated about the central axis Ls. This causes the valve element 14 to separate from the valve seat 13 as shown in FIG. 18, further increasing the open area S. At that time, the valve opening degree $\theta$ becomes "$\beta$" (see FIG. 19). The valve element 14 at that time is located at a position represented by a point P1d in FIG. 20 showing the relationship between the valve opening degree $\theta$ and the open area S. In the above manner, the valve opening operation of the integrated valve 181 by the motor drive force Fm1 is performed.

In the present embodiment, the integrated valve 181 includes the two, first bearing 37 and second bearing 38. Instead of these first and second bearings 37 and 38, a single bearing may be installed or three or more bearings may be installed.

Figure 22:
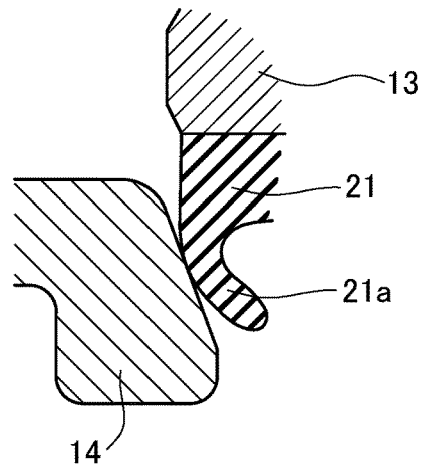
FIG. 22 is a view showing a rubber seat in a modified example.
Figure 23:
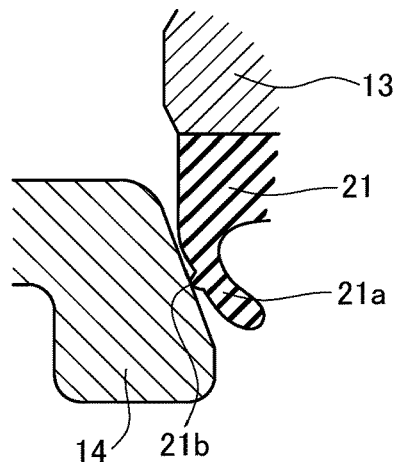
FIG. 23 is a view showing a rubber seat in another modified example.

A conceivable modified example is to use a rubber seat 21 shown in FIG. 22 or 23. As shown in FIG. 22, a rubber seat 21 has a lip-seal configuration that a deformable portion 21a has a lip-like shape (a protruding shape which is bendable when pressed by the valve element 14). As shown in FIG. 23, on the other hand, a rubber seat 21 has a combination configuration of a lip seal and a bead that a deformable portion 21a has a lip-like shape and is formed with a bead 21b (a projection which can come into close contact with the valve element 14). The rubber seat 21 may be provided in the valve element 14 instead of the valve seat 13.

The integrated valve 181 configured as above in the present embodiment generates the force Fs4 during non-operation of the motor 32. This force Fs4 is a force that is caused by the return spring force Fs1 and that acts in a perpendicular direction to the central axis Lj of the first bearing 37 and the second bearing 38. The force Fs4 causes the rotary shaft 15 to incline about the first bearing 37 serving as the fulcrum, thereby urging the valve element 14 in the direction away from the valve seat 13. Furthermore, the rubber seat 21 is provided in either one of the valve element 14 or the valve seat 13 to seal between the valve element 14 and the valve seat 13 during non-operation of the motor 32.

In the above way, the rubber seat 21 closes or seals between the valve seat 13 and the valve element 14. Thus, the integrated valve 181 can achieve an enhanced sealing property with a simple structure.

In the present embodiment, moreover, the rubber seat 21 includes the deformable portion 21a with a leading end which can come into contact with the valve element 14 during non-operation of the motor 32 and can be deformed when pressed by the valve element 14 during operation of the motor 32. A deformation amount of the deformable portion 21a during operation of the motor 32 is smaller than a deformation amount of the deformable portion 21a when it is plastically deformed. Accordingly, the deformable portion 21a of the rubber seat 21 is not excessively pressed by the valve element 14 and thus abrasion of the rubber seat 21 can be reduced. In the case where the rubber seat 21 is provided in the valve element 14, the leading end of the deformable portion 21a contacts the valve seat 13 during non-operation of the motor 32 and is pressed and deformed against the valve seat 13 during operation of the motor 32.

The eccentric valve of the invention is also applicable to the sealing valve 174 and the bypass valve 191 in the air system 113 of the fuel cell system 101.

Second Embodiment

Next, a second embodiment will be described in which similar or identical components or parts to those in the first embodiment are assigned the same reference signs as those in the first embodiment without repetition of their explanation. The following description is made with a focus on differences from the first embodiment.

In the present embodiment, after power generation in the fuel cell 111 is stopped, the integrated valve 181 is closed, but the motor 32 is not stopped immediately. The motor 32 is kept operating to press the valve element 14 against the rubber seat 21 to establish a sealing state between them and thereafter the motor 32 is stopped to keep the sealing state.

Figure 26:
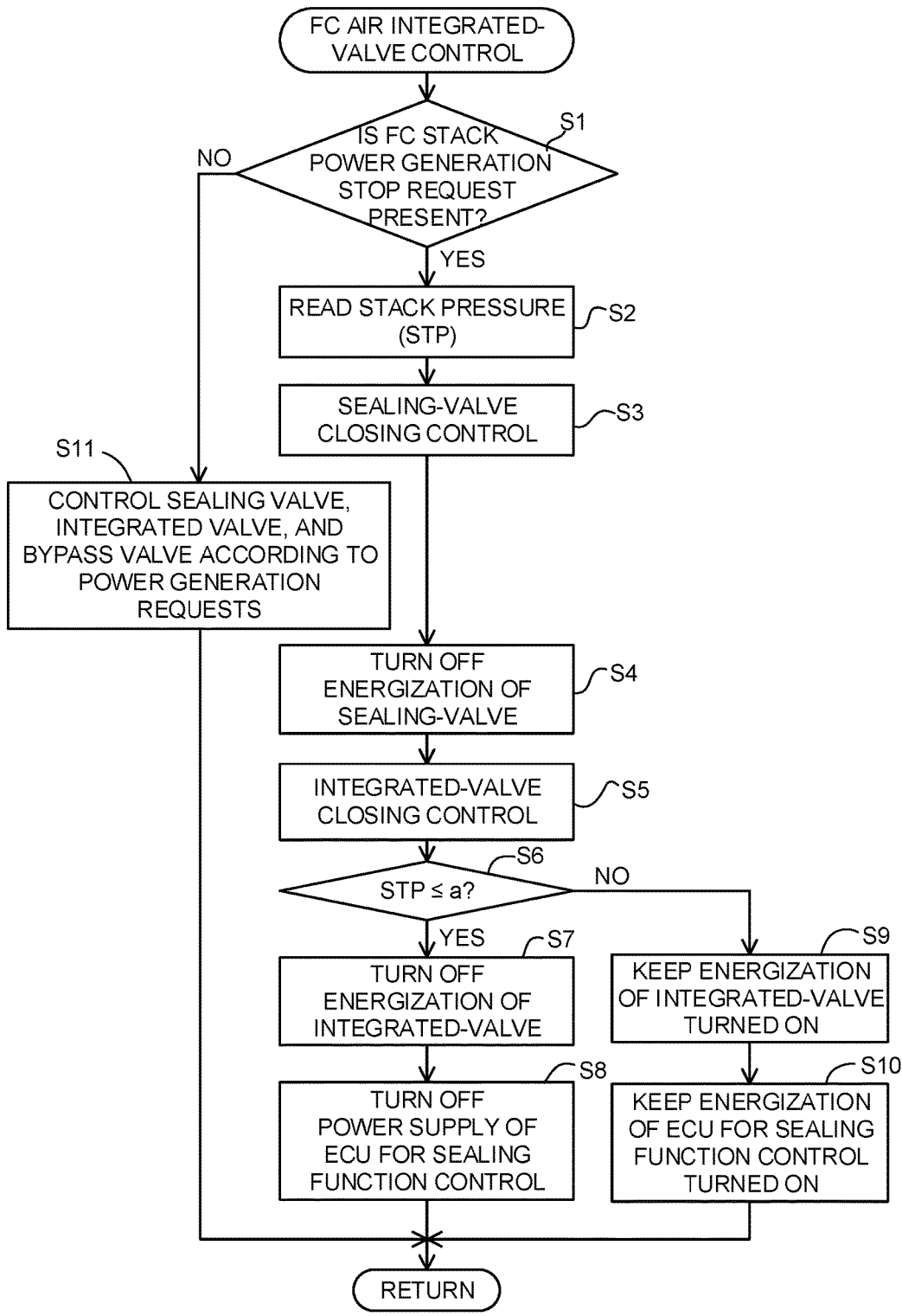
FIG. 26 is a control flowchart in a second embodiment.

Therefore, the controller 201 executes a control based on a control flowchart shown in FIG. 26 (FC air integrated-valve control). The controller 201 firstly determines whether a FC stack power generation stop request is present (step S1). Herein, the "FC stack power generation stop request" is a request for stop of power generation in the fuel cell 111. When the FC stack power generation stop request is present (step S1: YES), the controller 201 reads a stack pressure STP (step S2), executes sealing-valve closing control (step S3), and turns the sealing valve 174 to an OFF position, namely, turns off, or stops, energization of a drive mechanism of the sealing valve 174 (step S4) to execute integrated-valve closing control (step S5). Herein, the "stack pressure STP" is internal pressure of the fuel cell 111. The "sealing-valve closing control" is control of closing the sealing valve 174. Further, the "integrated-valve closing control" is control of closing the integrated valve 181.

Successively, the controller 201 determines whether the stack pressure STP is equal to or less than a predetermined pressure a (a predetermined negative pressure) (step S6). When the stack pressure STP is equal to or less than the predetermined pressure a (step S6: YES), the controller 201 turns off energization of the motor 32 of the integrated valve 181, thereby switching the motor 32 from the operation state to the non-operation state (step S7), and turns off a power supply of an ECU (ECU for sealing function control) (step S8). Herein, the predetermined pressure a is a negative pressure, namely, is lower than atmospheric pressure.

When the stack pressure STP decreases to be equal to or less than the predetermined pressure a, the controller 201 stops energization of the motor 32 of the integrated valve 181 to switch the motor 32 from the operation state to the non-operation state. Specifically, the motor 32 is to be switched from the operation state to the non-operation state as below. Firstly, while the internal pressure of the fuel cell 111 is higher than the predetermined pressure a, energization of the motor 32 is kept to press the valve element 14 against the rubber seat 21 to establish a sealing state between them. Then, when the internal pressure of the fuel cell 111 becomes equal to or less than the predetermined pressure a, energization of the motor 32 is stopped, allowing the valve element 14 to contact the rubber seat 21 under the negative internal pressure of the fuel cell 111 to establish a sealing state between them.

In step S6, when the stack pressure STP is higher than the predetermined pressure a (step S6: NO), energization of the integrated valve 181 is kept turned on, that is, the motor 32 of the integrated valve 181 continues to be energized and kept operating (step S9), and the power supply of the ECU is kept turned on (step S10).

In step S1, when the FC stack power generation stop request is not present (step S1: NO), the controller 201 executes a control according to power generation requests for the sealing valve 174, the integrated valve 181, and the bypass valve 191 (step S11).

Figure 27:
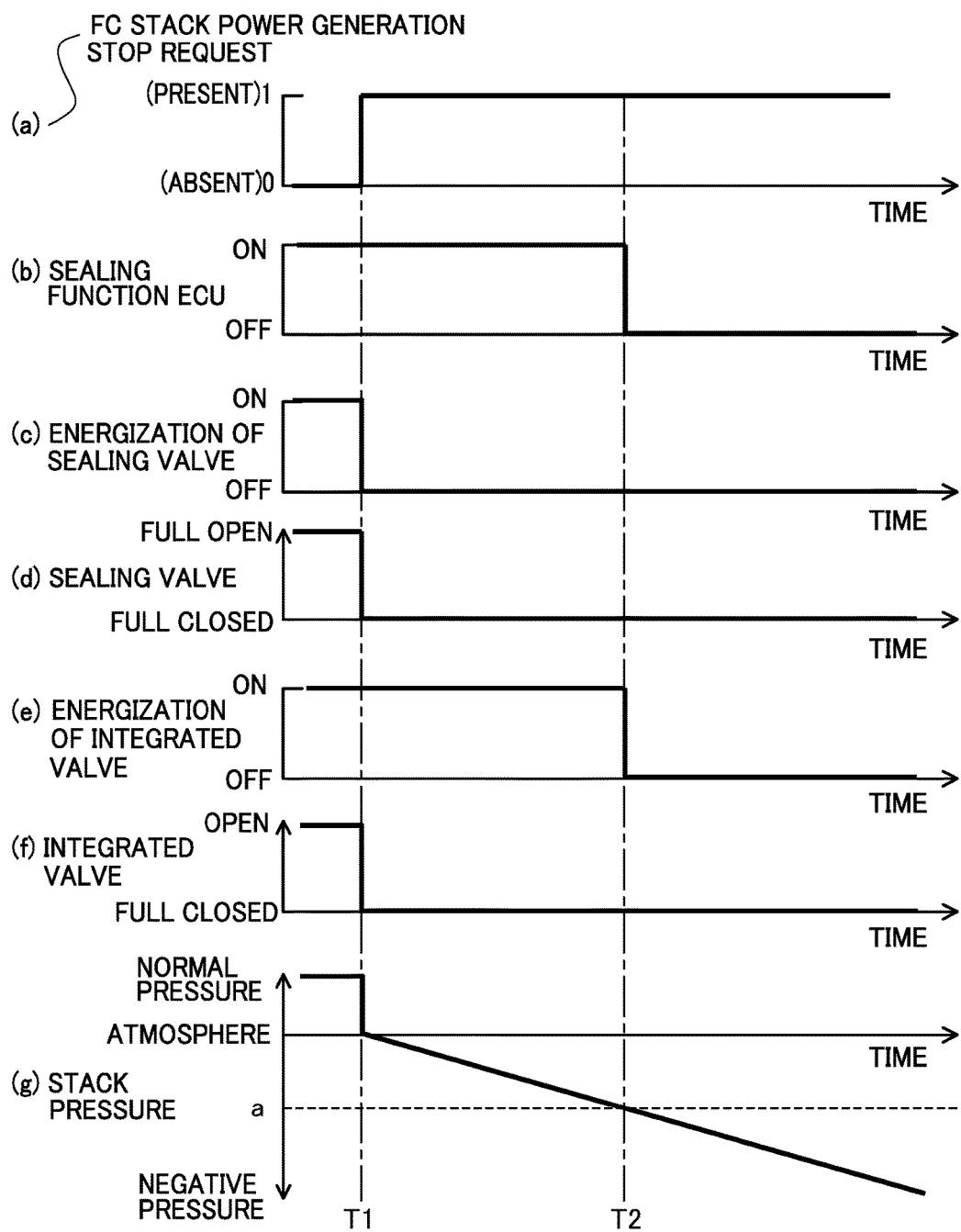
FIG. 27 is a time chart in the second embodiment.

When the control based on the foregoing control flowchart is executed, for example, a control represented by a control time chart shown in FIG. 27 is performed. As shown in FIG. 27, after the FC stack power generation stop request is made at time T1, when the stack pressure STP becomes equal to or less than the predetermined pressure a at time T2, energization of the motor 32 of the integrated valve 181 is stopped.

According to the present embodiment, when the motor 32 is to be switched from the operation state to the non-operation state, the motor 32 is switched to the non-operation state after the pressure on the valve element 14 on the side facing to the valve seat 13, that is, the stack pressure STP, reaches the predetermined pressure a. In this manner, the motor 32 is operated until the stack pressure STP reaches the predetermined pressure a and, after the stack pressure STP has reached the predetermined pressure a, the motor 32 is brought into the non-operation state to allow the valve element 14 to move toward the valve seat 13 by utilization of the negative pressure generated in the fuel cell 111. Even when the rubber seat 21 has worn, the sealing property, or strength, between the valve seat 13 and the valve element 14 during valve closing can be enhanced. Further, during stop of power generation in the fuel cell 111, even when the motor 32 of the integrated valve 181 is turned to the non-operation state, the valve element 14 is allowed to move toward the valve seat 13 by utilization of the negative pressure generated in the fuel cell 111. Accordingly, during non-operation of the motor 32, the sealing property between the valve seat 13 and the valve element 14 during valve closing can be enhanced.

Third Embodiment

Next, a third embodiment will be described below. Similar or identical components or parts to those in the first and second embodiments are assigned the same reference signs as those in those embodiment without repetition of their explanation. The following description is given with a focus on differences from the first and second embodiments.

In the present embodiment, during operation of the motor 32, the control is executed in a sealing control mode and a pressure-regulating mode. Herein, the sealing control mode is a mode of controlling the rotation of the valve element 14 while the valve element 14 at an opening degree near a fully-closed position. This sealing control mode will be performed for instance during stop of a vehicle in which the fuel cell system 101 is mounted. The pressure-regulating mode is a mode of controlling the open area S of the valve hole 16 to regulate a flow rate of air. In this pressure-regulating mode, the valve element 14 is controlled with a larger opening degree than that in the sealing control mode. This pressure-regulating mode will be performed for example during running of a vehicle in which the fuel cell system 101 is mounted.

Figure 28:
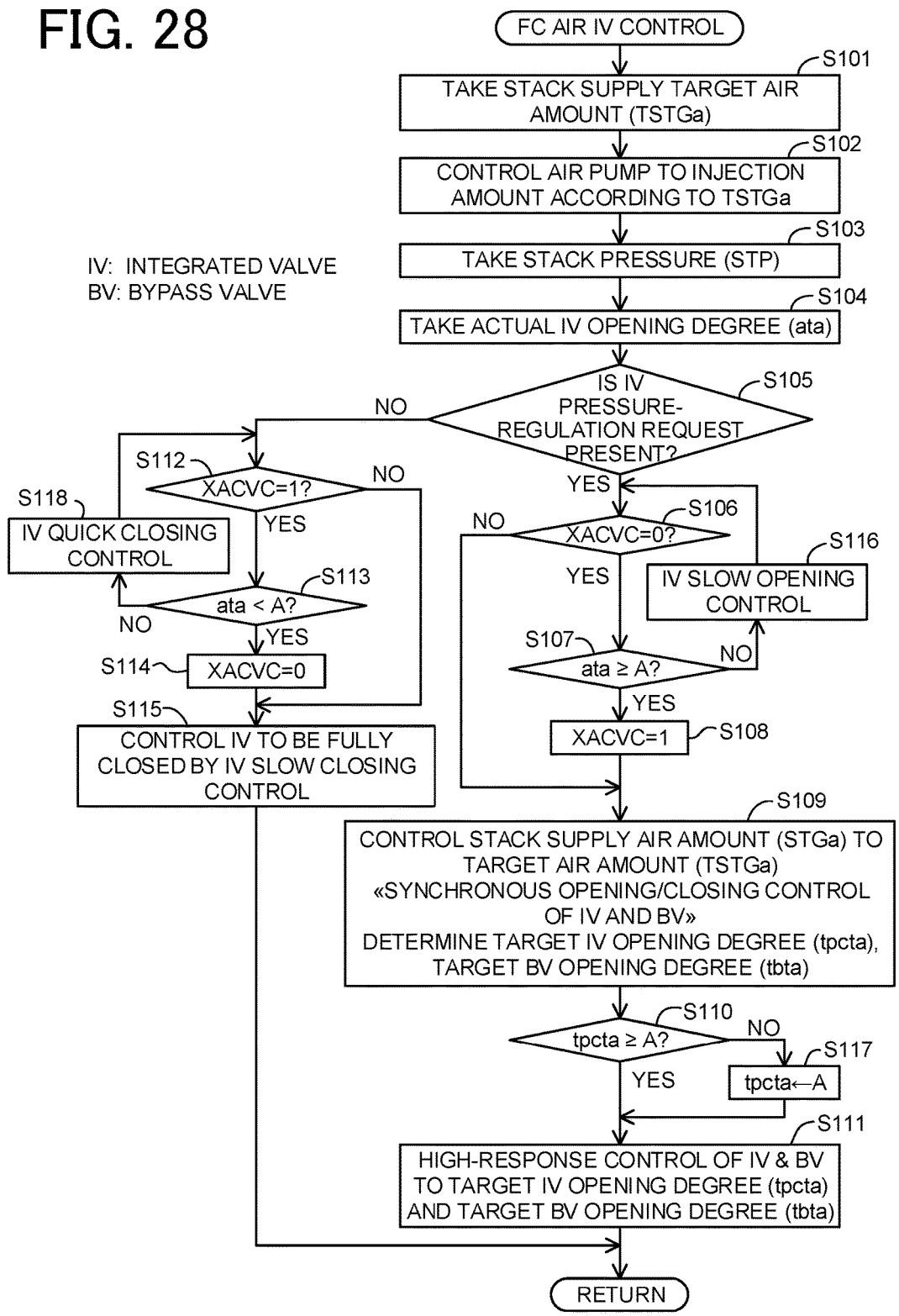
FIG. 28 is a control flowchart in a third embodiment.

Therefore, the controller 201 executes a control based on the control flowchart shown in FIG. 28 (FC air integrated-valve control). Firstly, the controller 201 takes a stack supply target air amount (a target amount of air to be supplied to a FC stack) TSTGa (step S101), and controls an injection amount of the air pump 172 to an amount according to the stack supply target air amount TSTGa (step S102). The controller 201 further takes a stack pressure STP (step S103), and takes an actual integrated-valve opening degree ata, that is, a current actual opening degree of the valve element 14 of the integrated valve 181 (step S104).

Subsequently, the controller 201 determines whether an integrated-valve pressure-regulating request is present or absent (step S105). When the integrated-valve pressure-regulating request is present (step S105: YES), it is determined whether a XACVC flag is 0 or not (step S106). This XACVC flag is a determination flag for the angle A.

Figure 24:
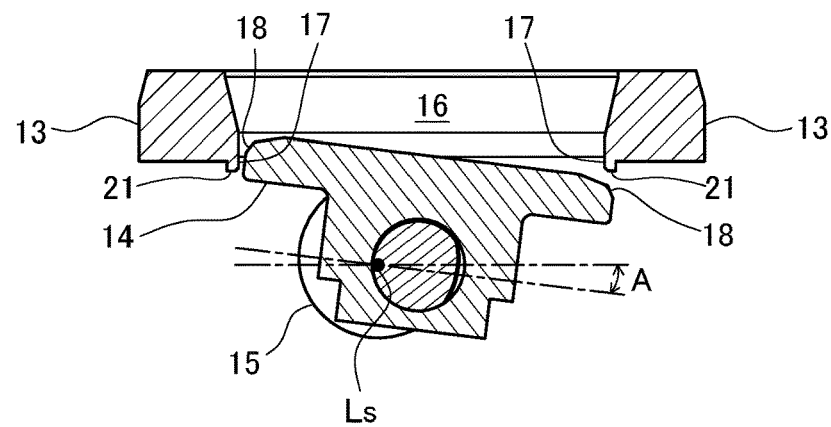
FIG. 24 is a cross-sectional view of the valve seat and the valve element and their surrounding parts when an opening degree of the valve element is an angle A.
Figure 25:
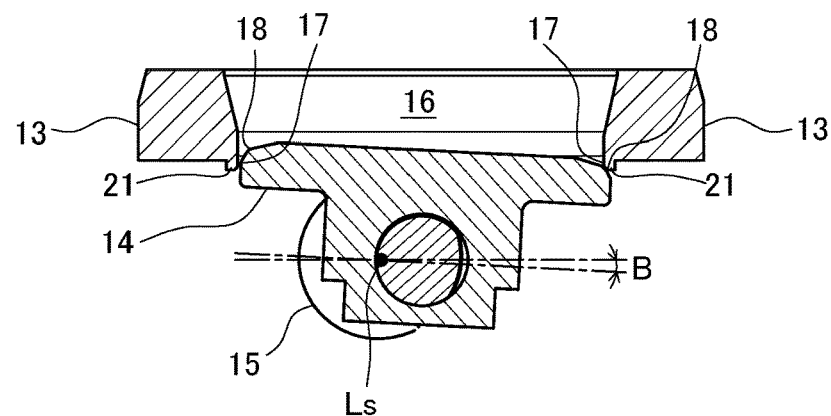
FIG. 25 is a cross-sectional view of the valve seat and the valve element and their surrounding parts when the opening degree of the valve element is an angle B.

When the XACVC flag is 0 (step S106: YES), the controller 201 judges if the actual integrated-valve opening degree ata is equal to or larger than the angle A (step S107). Herein, the time when the actual integrated-valve opening degree ata is the angle A represents the time when the opening degree of the valve element 14 of the integrated valve 181, that is, the valve opening degree θ (the rotation angle of the rotary shaft 15 and the rotation angle of the main gear 41) is the angle A as shown in FIG. 24. At that time, as show in FIG. 24, the valve element 14 and the rubber seat 21 are not in contact with each other.

When the actual integrated-valve opening degree ata is equal to or higher than the angle A (step S107: YES), that is, when the pressure-regulating mode in which the valve element 14 and the rubber seat 21 are out of contact with each other, the XACVC flag is turned to 1 (step S108). Then, a target integrated-valve opening degree tpcta and a target bypass-valve opening degree tbta are determined in order to control a stack supply air amount STGa to the stack supply target air amount TSTGa (step S109).

The controller 201 then determines whether or not the target integrated-valve opening degree tpcta is equal to or higher than the angle A (step S110). When the target integrated-valve opening degree tpcta is equal to or higher than the angle A (step S110: YES), the controller 201 controls the opening degree of the valve element 14 of the integrated valve 181 to the target integrated-valve opening degree tpcta with high responsivity. Specifically, the controller 201 increases the rotation speed of the valve element 14 of the integrated valve 181 and adjusts the opening degree of the valve element 14 to the target integrated-valve opening degree tpcta, and controls the bypass valve 191 to the target bypass valve opening degree tbta with high responsivity (step S111). The pressure-regulating mode is thus performed when the valve element 14 and the rubber seat 21 are in a non-contact state with each other.

In step S105, when the integrated-valve pressure-regulating request is absent (step S105: NO), the controller 201 determines whether or not the XACVC flag is 1 (step S112). When the XACVC flag is 1 (step S112: YES), it is determined whether or not the actual integrated-valve opening degree ata is smaller than the angle A (step S113). When the actual integrated-valve opening degree ata is smaller than the angle A (step S113: YES), the controller 201 turns the XACVC flag to 0 (step S114) and controls the integrated valve 181 to be fully closed by integrated-valve slow closing control (step S115). To be concrete, in the sealing control mode where the actual integrated-valve opening degree ata is less than the angle A (i.e., when the opening degree of the valve element 14 is close to a fully-closed position), the controller 201 causes the integrated valve 181 to be fully closed by decreasing the rotation speed of the valve element 14. In this manner, the rotation speed of the valve element 14 in the sealing control mode is made slower than the rotation speed of the valve element 14 in the pressure-regulating mode.

In step S106, when the XACVC flag is not 0 (step S106: NO), the processing in step S109 is carried out.

In step S107, when the actual integrated-valve opening degree ata is less than the angle A (step S107: NO), integrated-valve slow opening control is executed, that is, the valve-opening control is conducted by decreasing the rotation speed of the valve element 14 (step S116), and the processing in step S106 is carried out. Specifically, in the sealing control mode where the actual integrated-valve opening degree ata is less than the angle A (i.e., when the opening degree of the valve element 14 is close to a fully-closed position), the integrated valve 181 is opened by decreasing the rotation speed of the valve element 14.

In step S110, when the target integrated-valve opening degree tpcta is less than the angle A (step S110: NO), the processing in step S111 is performed by assigning the target integrated-valve opening degree tpcta to the angle A (step S117).

In step S112, when the XACVC flag is not 1 (step S112: NO), the processing in step S115 is performed.

In step S113, when the actual integrated-valve opening degree ata is equal to or higher than the angle A (step S113: NO), integrated-valve quick closing control is executed, that is, the valve-closing control is conducted by increasing the rotation speed of the valve element 14 (step S118). Further, the processing in step S112 is carried out.

Figure 29:
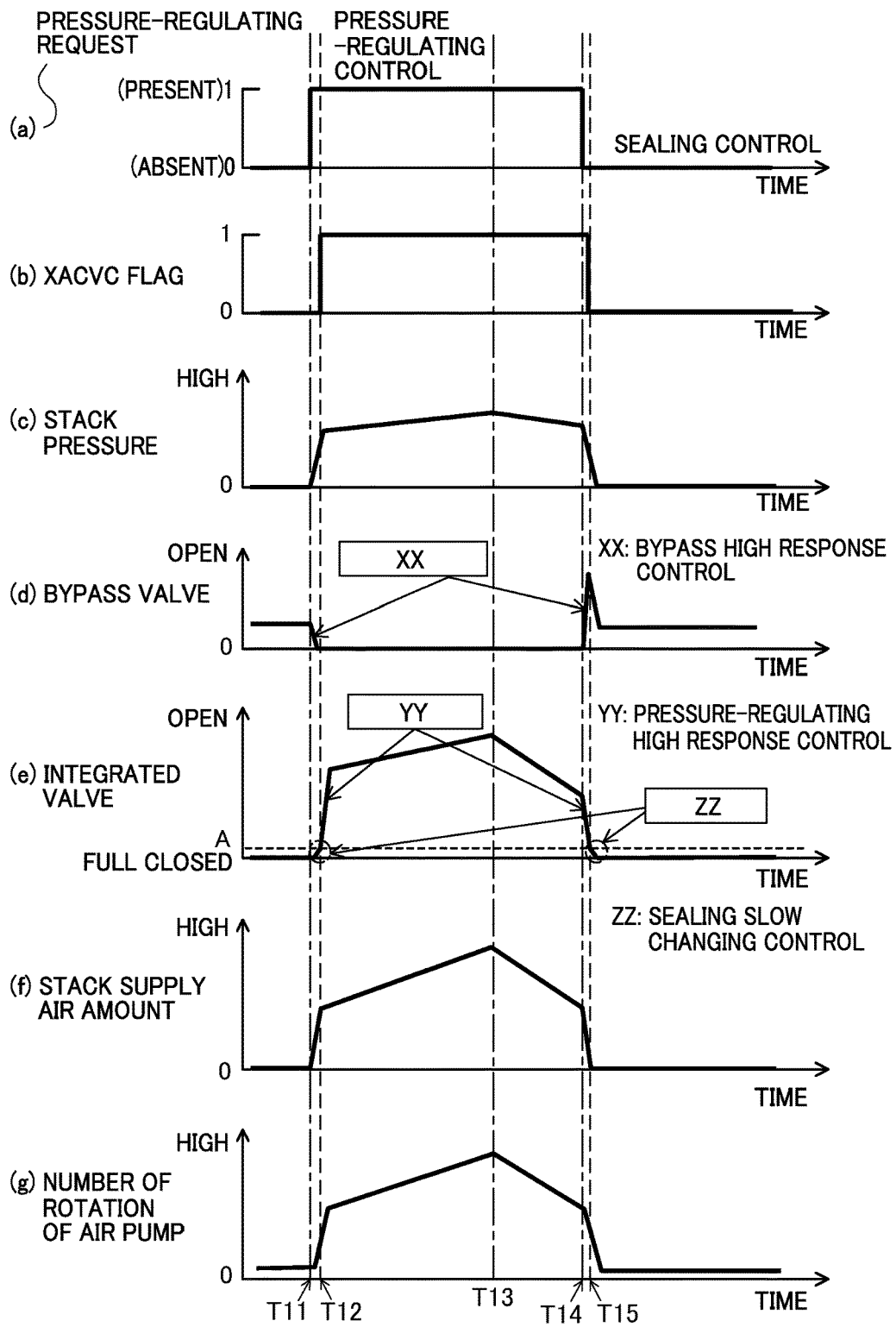
FIG. 29 is a time chart in the third embodiment.

When the control based on the foregoing control flowchart is executed, for example, a control represented by a control time chart shown in FIG. 29 is performed. As shown in FIG. 29, sealing slow changing control is executed at time T11 and time T15. Specifically, the integrated-valve slow opening control is conducted at time T11 and the integrated-valve slow closing control is conducted at time T15. Further, pressure-regulating high response control is executed at time T12 and time T14. Specifically, the opening degree of the valve element 14 of the integrated valve 181 is controlled with high responsivity. Further, at time T11 and T14, bypass high-response control is performed, that is, the opening degree of a valve element of the bypass valve 191 is controlled with high responsivity.

According to the present embodiment, the control mode to be performed during operation of the motor 32 includes the pressure-regulating mode and the sealing control mode. In the pressure-regulating mode, the valve element 14 and the rubber seat 21 are in a non-contact state with each other. In the pressure-regulating mode which will be performed with high frequency, the valve element 14 and the rubber seat 21 are not in contact with each other. This can minimize the number of times the valve element 14 and the rubber seat 21 slide against each other. Thus, abrasion or wear of the rubber seat 21 can be reduced.

The rotation speed of the valve element 14 in the sealing control mode is slower than the rotation speed of the valve element 14 in the pressure-regulating mode. Accordingly, the sliding intensity of the valve element 14 with respect to the rubber seat 21 in the sealing control mode can be reduced, thus enabling reduction in abrasion or wear of the rubber seat 21.

Fourth Embodiment

Next, a fourth embodiment will be described below, in which similar or identical components or parts to those in the first through third embodiments are assigned the same reference signs as those in the first through third embodiments without repetition of the details thereof. The following description is given with a focus on differences from the first through third embodiments.

In the present embodiment, in a vehicle mounted with the fuel cell system 101, when a regenerative brake request is made and power generation of the fuel cell 111 is stopped, surplus electric power generated by reaction between hydrogen gas and oxygen gas remaining in the fuel cell 111 is consumed for driving the air pump 172 while a battery (not shown) is in a full-charged state. At that time, the integrated valve 181 is closed, but a leakage amount of air in the integrated valve 181 does not have to be 0. Therefore, when the regenerative brake request is made, the integrated valve 181 is not controlled to be fully closed but is controlled to bring the valve element 14 in a position where it begins to contact the rubber seat 21 (e.g., a position shown in FIG. 15) so that the valve element 14 is pressed against the rubber seat 21 with low pressure. Specifically, the opening degree of the valve element 14 is adjusted to an angle B which is larger than the angle set for full closing and smaller than the angle A.

Figure 30:
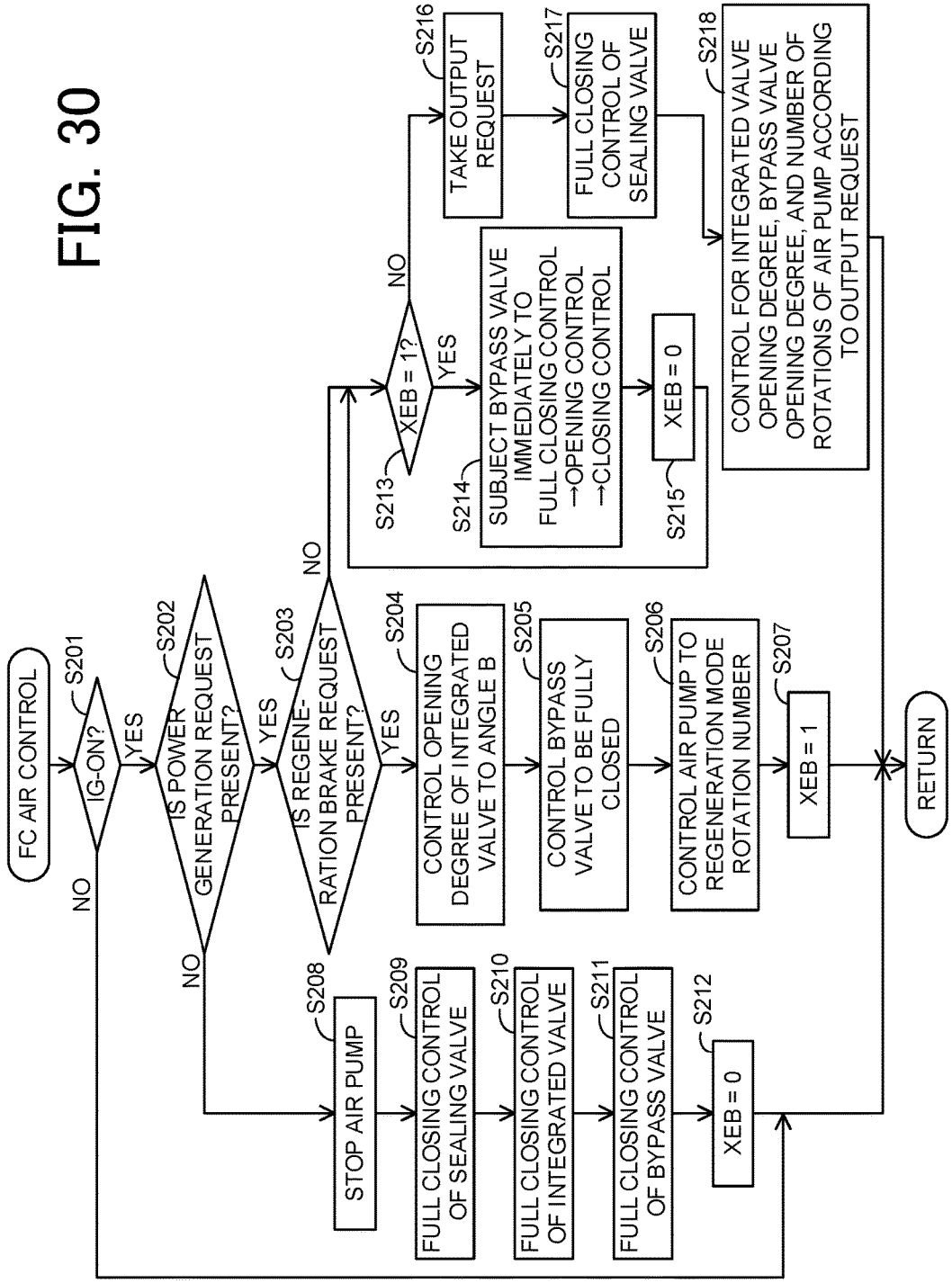
FIG. 30 is a control flowchart in a fourth embodiment.

Therefore, the controller 201 executes a control based on a control flowchart shown in FIG. 30 (FC air control). When an ignition switch IG is ON (step S201: YES), the controller 201 determines whether or not a power generation request is present (step S202). When the power generation request is present (step S202: YES), it is further determined whether or not the regenerative brake request is present (step S203). When the regenerative brake request is present (step S203: YES), the opening degree of the valve element 14 of the integrated valve 181 is adjusted to the angle B (step S204), the bypass valve 191 is controlled to be fully closed (step S205), the air pump 172 is controlled to operate at the number of rotations for a regenerative mode (step S206), and a XEB flag is turned to 1 (step S207).

In this way, when the regenerative brake request is made and the air pump 172 is thus operated, the opening degree of the valve element 14 is held at the angle B. This angle B is an opening degree at some point within an opening degree range in the sealing control mode and is larger than the angle set for full closing and smaller than the angle A. The XEB flag is a regenerative brake control flag, which is set to 0 when the regenerative brake is not performed or set to 1 when the regenerative brake is in operation.

In step S202, when the power generation request is absent (step S202: NO), the controller 201 stops the air pump 172 (step S208), performs full closing control of the sealing valve, the integrated valve, and the bypass valve (step S209 to S211), and turns the XEB flag to 0 (step S212).

In step S203, when the regenerative brake request is absent (step S203: NO), the controller 201 determines whether or not the XEB flag is 1 (step S213). When the XEB flag 1, that is, when a return request is present (step S213: YES), the controller 201 immediately performs full closing control of the bypass valve 191, the valve-opening control, and the valve-closing control (step S214), the XEB flag is turned to 0 (step S215), and further the processing in step S213 is performed.

In step S213, when the XEB flag is not 1, that is, when a running power generation request (a request for power generation during running) is present (step S213: NO), an output request is taken (step S216) and sealing-valve full-opening control is executed (step S217) to control the integrated-valve opening degree, the bypass valve opening degree, and the number of rotations of the air pump according to the output request (step S218).

Figure 31:
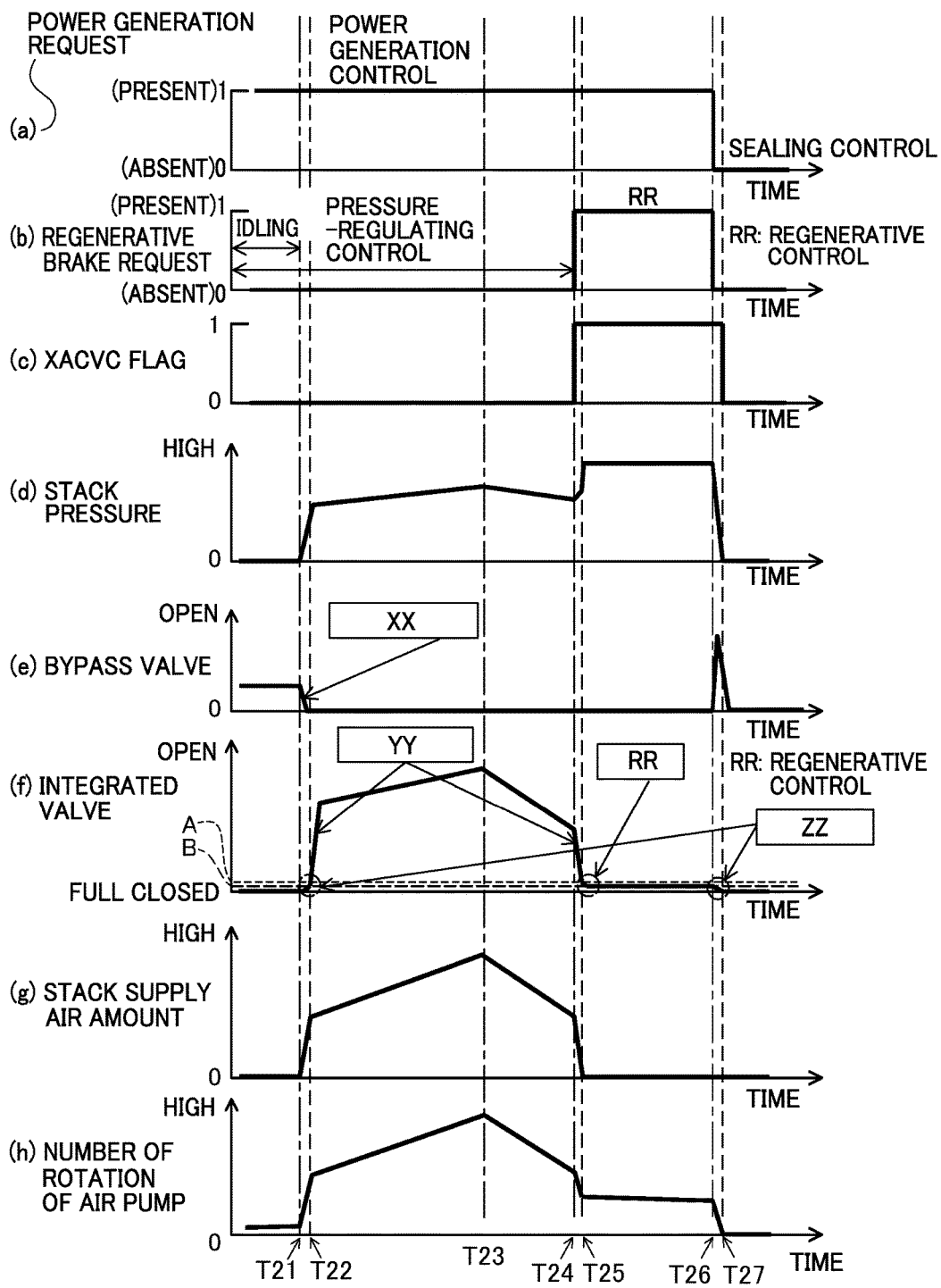
FIG. 31 is a time chart in the fourth embodiment.

When the control based on the foregoing control flow charge are executed, for example, a control represented by a control time chart shown in FIG. 31 is executed. As shown in FIG. 31, at time T25, regenerative control is conducted. Specifically, at time T25, the opening degree of the valve element 14 of the integrated valve 181 is adjusted to the angle B.

According to the present embodiment, when the air pump 172 is operated in response to the regenerative brake request, the opening degree of the valve element 14 is held at the angle B. Accordingly, the full closing control of the integrated valve 181 is not executed when the regenerative brake request is frequently made, but is executed only when a vehicle is completely stopped. Therefore, the valve element 14 and the rubber seat 21 can be prevented from frequently sliding against each other. Thus, while wear of the rubber seat 21 is suppressed, surplus electric power generated when the regenerative brake request is made can be consumed for operation of the air pump 172.

The foregoing embodiments are mere examples and do not give any limitations to the present invention. The present invention may be embodied in other specific forms without departing from the essential characteristics thereof. For instance, the rotary shaft 15 may be supported at both ends by the first bearing 37 and another bearing (not shown) separately provided on an opposite side of the valve element 14.

REFERENCE SIGNS LIST

2 Valve unit
3 Drive mechanism unit
11 Passage
13 Valve seat
14 Valve element
15 Rotary shaft
15a Pin
15b Proximal end portion
16 Valve hole
17 Seat surface
18 Seal surface
21 Rubber seat
21a Deformable portion
21b Bead
32 Motor
35b Full-close stopper
35c Spring hook part
37 first bearing
38 Second bearing
40 Return spring
40a Far-side hook
40b Near-side hook
41 Main gear
41a Full-stopper 41b Gear part
41c Spring hook part
41d Spring guide part
101 Fuel cell system
111 Fuel cell
112 Hydrogen system
113 Air system
162 Air exhaust passage
174 Sealing valve
181 Integrated valve
191 Bypass valve
Ls Central axis (of rotary shaft)
Lv Central axis (of valve element)
Lj Central axis (of bearing)
Fs1 Return spring force
Fs4 Force (Separating-direction urging force)
Fm1 Motor drive force
Fm3 Force (Seating-direction urging force)
θ Valve opening degree

The invention claimed is:

1. An eccentric valve comprising:
a valve seat including a valve hole and a seat surface formed at an edge of the valve hole;
a valve element formed with a seal surface on an outer periphery corresponding to the seat surface;
a rotary shaft integrally provided with the valve element to rotate the valve element, and
the rotary shaft having a central axis extending in parallel to a radial direction of the valve element, the central axis of the rotary shaft being positioned eccentrically from a center of the valve hole in another radial direction of the valve hole, and the seal surface being positioned eccentrically from the central axis of the rotary shaft toward an extending direction of a central axis of the valve element,
wherein the eccentric valve further comprises:
a drive mechanism configured to generate a drive force to rotate the rotary shaft in a valve opening direction;
a drive force receiving part integrally provided with the rotary shaft and configured to receive the drive force;
a bearing placed in a position between the valve element and the drive force receiving part in a direction of the central axis of the rotary shaft to support the rotary shaft; and
a return spring configured to generate a return spring force to rotate the rotary shaft in a valve closing direction,
wherein, during non-operation of the drive mechanism, the eccentric valve generates a separating-direction urging force to cause the rotary shaft to incline about the bearing serving as a fulcrum and urge the valve element in a direction away from the valve seat, the separating-direction urging force being a force caused by the return spring force and acting in a direction perpendicular to a central axis of the bearing,
either the valve element or the valve seat is provided with a sealing member to seal between the valve element and the valve seat during non-operation of the drive mechanism,
the sealing member includes a deformable portion having a leading end that comes into contact with the valve element or the valve seat during non-operation of the drive mechanism and that is deformed when pressed by the valve element or a valve seat during operation of the drive mechanism, and
a deformation amount of the deformable portion during operation of the drive mechanism is smaller than a deformation amount of the deformable portion when plastically deformed.

2. The eccentric valve according to claim 1, wherein when the drive mechanism is to be switched from an operation state to a non-operation state, the drive mechanism is switched to the non-operation state after a pressure on the valve element on a side facing the valve seat, reaches a predetermined negative pressure.

3. The eccentric valve according to claim 1, wherein the eccentric valve is configured to perform a control mode during operation of the drive mechanism, the control mode including a pressure-regulating mode for controlling an open area of the valve hole and a sealing control mode for controlling rotation of the valve element near a fully-closed position of the valve element.

4. The eccentric valve according to claim 3, wherein a rotation speed of the valve element in the sealing control mode is slower than a rotation speed of the valve element in the pressure-regulating mode.

5. The eccentric valve according to claim 3, wherein the valve element and the sealing member in the pressure-regulating mode are in a non-contact state with each other.

6. The eccentric valve according to claim 3, wherein
the eccentric valve is provided with a passage through which air in a fuel cell system flows, and
when the fuel cell system drives an air pump to control a flow rate of the air in response to a regenerative brake request, an opening degree of the valve element is maintained at an opening degree within an opening degree range determined in the sealing control mode.

* * * * *